(12) United States Patent
Wei

(10) Patent No.: US 10,798,094 B2
(45) Date of Patent: Oct. 6, 2020

(54) BLOCKCHAIN-BASED ACCOUNT MANAGEMENT

(71) Applicant: Alibaba Group Holding Limited, George Town (KY)

(72) Inventor: Yawen Wei, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/803,510

(22) Filed: Feb. 27, 2020

(65) Prior Publication Data

US 2020/0195645 A1 Jun. 18, 2020

Related U.S. Application Data

(63) Continuation of application No. PCT/CN2020/071835, filed on Jan. 13, 2020.

(30) Foreign Application Priority Data

Jul. 24, 2019 (CN) .......................... 2019 1 0671978

(51) Int. Cl.
*H04L 29/06* (2006.01)
*H04L 9/32* (2006.01)

(52) U.S. Cl.
CPC ........ *H04L 63/0884* (2013.01); *H04L 9/3236* (2013.01); *H04L 63/0807* (2013.01);
(Continued)

(58) Field of Classification Search
CPC ............... H04L 63/0884; H04L 63/102; H04L 63/0823; H04L 63/0807
See application file for complete search history.

(56) References Cited

U.S. PATENT DOCUMENTS 8,347,349 B1* 1/2013 Wilson .................... H04L 63/20
726/1
9,990,504 B1* 6/2018 Chapman .............. H04L 9/0643
(Continued)

FOREIGN PATENT DOCUMENTS

| CN | 101064717 | 10/2007 |
|---|---|---|
| CN | 109271802 | 1/2019 |
| CN | 110445775 | 11/2019 |

OTHER PUBLICATIONS

Dai et al., "Blockchain-Based Smart Contract Access Control System," 2019 25th Asia-Pacific Conference on Communications (APCC) Year: 2019 | Conference Paper | Publisher: IEEE.*
(Continued)

*Primary Examiner* — Roderick Tolentino
(74) *Attorney, Agent, or Firm* — Fish & Richardson P.C.

(57) ABSTRACT

This disclosure relates to account management. In one aspect, a method includes receiving a permission query message from a service system. Verification information is obtained from a first client based on the permission query message. The verification information is associated with an identity of the current user. In response to determining that the verification information is valid, proxy permission information for the current user is obtained from a blockchain. The proxy permission information includes at least operation permission information of the current user for the enterprise account. The proxy permission information is sent to the service system. The proxy permission information configured to be usable by the service system to determine whether to authorize the current user to perform an operation on the enterprise account.

15 Claims, 11 Drawing Sheets

(52) U.S. Cl.
CPC ........ *H04L 63/0823* (2013.01); *H04L 63/102* (2013.01); *H04L 2209/38* (2013.01)

(56) References Cited

U.S. PATENT DOCUMENTS

| | | | | |
|---|---|---|---|---|
| 10,051,001 | B1* | 8/2018 | Ashley | H04L 63/0227 |
| 10,356,087 | B1* | 7/2019 | Vetter | H04W 12/0608 |
| 2012/0096271 | A1* | 4/2012 | Ramarathinam | G06F 9/45558 713/172 |
| 2014/0279533 | A1* | 9/2014 | Hamilton | G06Q 40/00 705/44 |
| 2015/0215297 | A1* | 7/2015 | Rathod | G07F 17/0014 726/7 |
| 2016/0248752 | A1 | 8/2016 | Blinn | |
| 2017/0330174 | A1* | 11/2017 | Demarinis | G06F 21/62 |
| 2018/0268151 | A1* | 9/2018 | Cuomo | H04L 9/3236 |
| 2020/0050613 | A1* | 2/2020 | Gauvreau, Jr. | G06F 21/60 |
| 2020/0167740 | A1* | 5/2020 | Finlow-Bates | G06Q 20/3829 |

OTHER PUBLICATIONS

Paillisse et al., "Distributed Access Control with Blockchain," ICC 2019—2019 IEEE International Conference on Communications (ICC) Year: 2019 | Conference Paper | Publisher: IEEE.*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2020/071835, dated Apr. 16, 2020, 14 pages (with partial Machine translation).

* cited by examiner

BLOCKCHAIN-BASED ACCOUNT MANAGEMENT

CROSS-REFERENCE TO RELATED APPLICATIONS

This application is a continuation of PCT Application No. PCT/CN2020/071835, filed on Jan. 13, 2020, which claims priority to Chinese Patent Application No. 201910671978.3, filed on Jul. 24, 2019, and each application is hereby incorporated by reference in its entirety.

TECHNICAL FIELD

Implementations of the present specification relate to the field of information technologies, and specifically, to account management.

BACKGROUND

Accounts usually need to be registered before a service system is used, and then service operations are performed based on the accounts. However, in many scenarios, an administrator of an account can be different from an actual user of the account. For example, for small and medium-sized enterprises, an administrator of an account can be an enterprise owner, and a user of the account can be an enterprise employee.

SUMMARY

In consideration of the previous problem in the existing technology, implementations of the present specification provide methods, apparatuses, and computing devices for account management.

According to an aspect, an implementation of the present specification provides a method for account management, the method is performed by a server, and the method includes the following: receiving a permission query message from a service system, where the permission query message is used to query operation permission of a current user for an enterprise account registered with the service system; obtaining verification information from a first client based on the permission query message, where the first client is installed in an end-user device used by the current user, and the verification information is associated with an identity of the current user; obtaining proxy permission information from a blockchain when it is determined that the verification information is valid, where the proxy permission information includes at least operation permission information of the current user for the enterprise account, and operation permission indicated by the operation permission information is specified by an administrator of the enterprise account; and sending the proxy permission information to the service system.

According to another aspect, an implementation of the present specification provides a method for account management, the method is performed by a first client, the first client is installed in an end-user device used by a current user, the current user is for an enterprise account registered with a service system, and the method includes the following: determining verification information, where the verification information is associated with an identity of the current user; and sending the verification information to a server, so that the server verifies the identity of the current user.

According to another aspect, an implementation of the present specification provides a method for account management, the method is performed by a second client, the second client is installed in an end-user device used by an administrator, the administrator is for an enterprise account registered with a service system, and the method includes the following: sending initialization information to a server when the administrator initiates an initialization request by using the end-user device, where the initialization information includes personal information of the administrator, device information of the end-user device, and information about an enterprise associated with the enterprise account; receiving an identity verification request for the administrator from the server; obtaining identity information of the administrator based on the identity verification request; sending the identity information to the server, so that the server performs identity verification on the administrator; and obtaining a digital certificate from the server, where the digital certificate is sent by the server after the identity verification on the administrator succeeds, and the digital certificate is used to prove authenticity of the administrator and the enterprise.

According to another aspect, an implementation of the present specification provides a method for account management, the method is performed by a service system, and the method includes the following: sending a permission query message to a server when a current user operates an enterprise account registered with the service system, where the permission query message is used to query operation permission of the current user for the enterprise account; receiving proxy permission information from the server, where the proxy permission information is obtained by the server from a blockchain after identity verification on the current user succeeds, the proxy permission information includes at least operation permission information of the current user for the enterprise account, and the operation permission information is specified by an administrator of the enterprise account; and determining, based on the proxy permission information, whether to authorize the current user to perform an operation on the enterprise account.

According to another aspect, an implementation of the present specification provides a server, including the following: a receiving unit, configured to receive a permission query message from a service system, where the permission query message is used to query operation permission of a current user for an enterprise account registered with the service system; a first acquisition unit, configured to obtain verification information from a first client based on the permission query message, where the first client is installed in an end-user device used by the current user, and the verification information is associated with an identity of the current user; a second acquisition unit, configured to obtain proxy permission information from a blockchain when it is determined that the verification information is valid, where the proxy permission information includes at least operation permission information of the current user for the enterprise account, and operation permission indicated by the operation permission information is specified by an administrator of the enterprise account; and a sending unit, configured to send the proxy permission information to the service system.

According to another aspect, an implementation of the present specification provides a first client apparatus, the first client apparatus is located in an end-user device used by a current user, the current user is for an enterprise account registered with a service system, and the first client apparatus includes the following: a determining unit, configured to determine verification information, where the verification information is associated with an identity of the current user; and a sending unit, configured to send the verification information to a server, so that the server verifies the identity of the current user.

According to another aspect, an implementation of the present specification provides a second client apparatus, the second client apparatus is located in an end-user device used by an administrator, the administrator is for an enterprise account registered with a service system, and the second client apparatus includes the following: a sending unit, configured to send initialization information to a server when the administrator initiates an initialization request by using the end-user device, where the initialization information includes personal information of the administrator, device information of the end-user device, and information about an enterprise associated with the enterprise account; a receiving unit, configured to receive an identity verification request for the administrator from the server; and an acquisition unit, configured to obtain identity information of the administrator based on the identity verification request, where the sending unit is further configured to send the identity information to the server, so that the server performs identity verification on the administrator; and the acquisition unit is further configured to obtain a digital certificate from the server, where the digital certificate is sent by the server after the identity verification on the administrator succeeds, and the digital certificate is used to prove authenticity of the administrator and the enterprise.

According to another aspect, an implementation of the present specification provides a service system, including the following: a sending unit, configured to send a permission query message to a server when a current user operates an enterprise account registered with the service system, where the permission query message is used to query operation permission of the current user for the enterprise account; a receiving unit, configured to receive proxy permission information from the server, where the proxy permission information is obtained by the server from a blockchain after identity verification on the current user succeeds, the proxy permission information includes at least operation permission information of the current user for the enterprise account, and the operation permission information is specified by an administrator of the enterprise account; and a determining unit, configured to determine, based on the proxy permission information, whether to authorize the current user to perform an operation on the enterprise account.

According to another aspect, an implementation of the present specification provides a computing device, including the following: at least one processor; a memory in communication with the at least one processor, where the memory stores an executable instruction, and when the executable instruction is executed by the at least one processor, the at least one processor is enabled to implement the method described for the server.

According to another aspect, an implementation of the present specification provides a computing device, including the following: at least one processor; a memory in communication with the at least one processor, where the memory stores an executable instruction, and when the executable instruction is executed by the at least one processor, the at least one processor is enabled to implement the method described for the first client.

According to another aspect, an implementation of the present specification provides a computing device, including the following: at least one processor; a memory in communication with the at least one processor, where the memory stores an executable instruction, and when the executable instruction is executed by the at least one processor, the at least one processor is enabled to implement the method described for the second client.

According to another aspect, an implementation of the present specification provides a computing device, including the following: at least one processor; a memory in communication with the at least one processor, where the memory stores an executable instruction, and when the executable instruction is executed by the at least one processor, the at least one processor is enabled to implement the method described for the service system.

It can be seen that in the technical solutions, identity verification on the current user who operates the enterprise account is performed to effectively control the risk of the enterprise account. Furthermore, the administrator specifies operation permission of an authorized user to allocate permission for the same account, and therefore the use of the same account can be fine-tuned. In addition, the proxy permission information is stored in the blockchain, and therefore it can be effectively ensured that the permission is trusted, thereby alleviating problems associated with a centralized node and access costs.

BRIEF DESCRIPTION OF DRAWINGS

By describing implementations of the present specification in more detail with reference to the accompanying drawings, the previous and other objects, features, and advantages of the implementations of the present specification become more prominent. In the implementations of the present specification, the same reference numerals usually represent the same elements.

DESCRIPTION OF IMPLEMENTATIONS

The subject matter described in the present specification is described with reference to implementations. It should be understood that description of these implementations is merely intended to make a user skilled in the art better understand and implement the subject matter described in the present specification, and is not intended to limit the protection scope, applicability, or examples described in the claims. Functions and arrangements of the described elements can be changed without departing from the protection scope of the claims. Various processes or components can be omitted, replaced, or added in each implementation as needed.

As used in the present specification, the term "include" and its variant represent an open term, and means "include but not limited to". The term "based on" means "at least partially based on". The terms "one implementation" and "an implementation" represent "at least one implementation". The term "another implementation" represents "at least one other implementation". The terms "first", "second", etc. can refer to different or the same objects. Other definitions, whether explicit or implicit, can be included below, and definitions of a term are consistent in the entire specification unless explicitly specified in the context.

Currently, a corresponding service operation is usually performed in a service system based on an account. However, an administrator of an account can be the same as or different from an actual user of the account. For example, for small and medium-sized enterprises, an administrator of an account can be an enterprise owner, and an actual user of the account can be an enterprise employee. In this case, the account needs to be managed effectively. For example, in terms of account and risk dimension, it is desired to determine a specific user and perceive whether there is a risk of leakage. In terms of service dimension, it is expected that different users can be granted different permission for the same account, so that the use of the same account can be fine-tuned.

In view of this, the present specification provides technical solutions for account management. In the technical solutions, three performers, namely, a server, a client, and a service system, are mainly involved. An enterprise account registered with the service system can be effectively managed through interactions of the server, the client, and the service system.

Figure 1A:
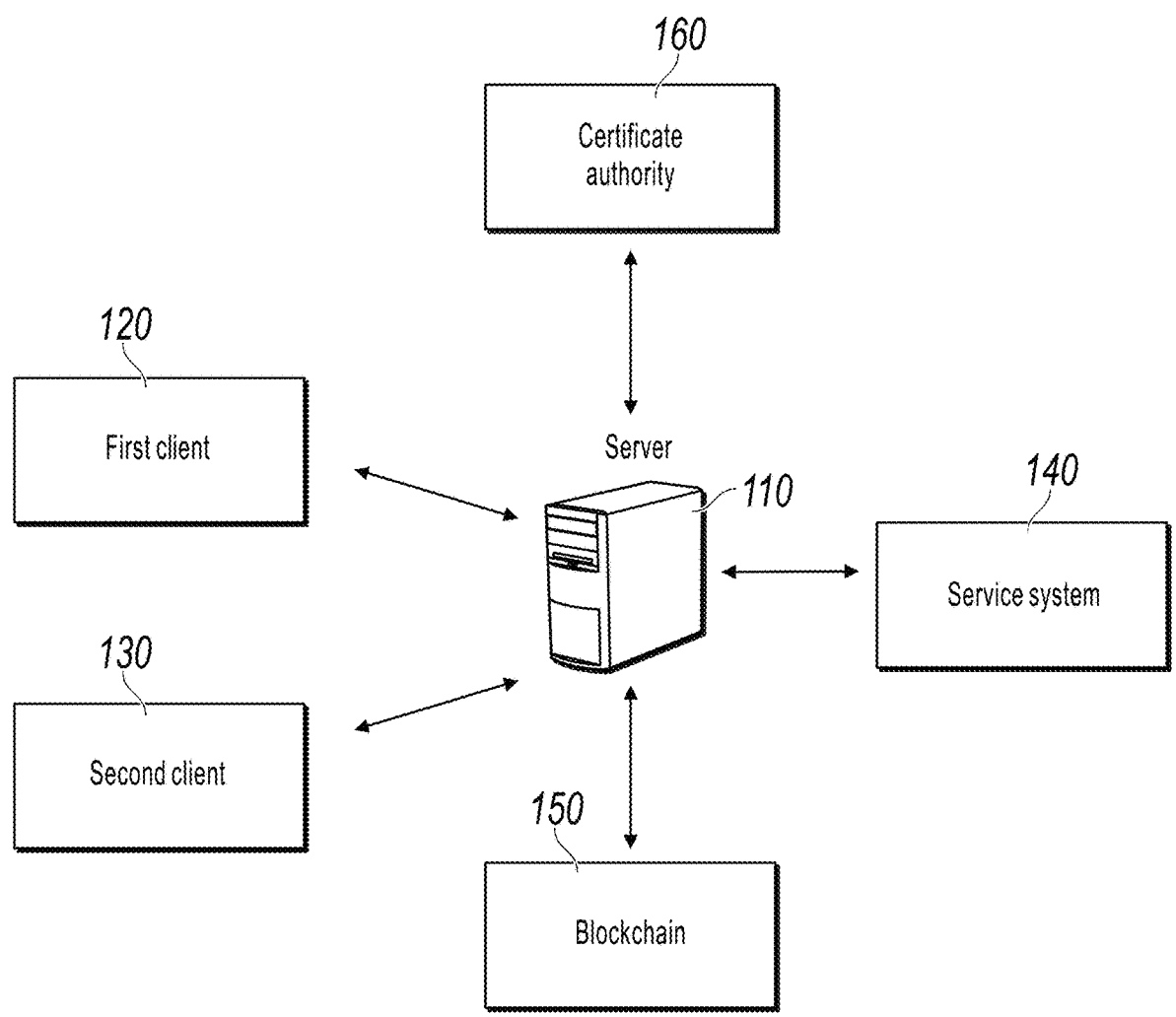
FIG. 1A is a schematic diagram illustrating an example of an application scenario, according to an implementation.

FIG. 1A is a schematic diagram illustrating an example of an application scenario, according to an implementation.

As shown in FIG. 1A, in the application scenario, a server 110, a first client 120, a second client 130, a service system 140, a blockchain 150, and a certificate authority 160 can be included.

The service system 140 can provide a service operation for a user. To perform a corresponding service operation in the service system 140, an account can be registered with the service system 140. An enterprise or an individual usually can register an account. In the present specification, description is mainly provided for an enterprise account. In addition, in the present specification, for ease of description, a user who manages the enterprise account is referred to as an administrator of the enterprise account, and a user who currently actually uses the enterprise account is referred to as a current user of the enterprise account. For example, for small and medium-sized enterprises, an administrator of an enterprise account can be an enterprise owner, and a current user of the enterprise account can be an enterprise employee.

It can be understood that in different scenarios, the administrator of the enterprise account can be the same as or different from the current user of the enterprise account.

In addition, in the present specification, an authorized user can be a user authorized to use the enterprise account. For example, the administrator can authorize one or more users to be authorized users of the enterprise account by using a proxy authorization process described below. Each authorized user can be associated with corresponding proxy permission information. The authorized users can have different operation permission or the same operation permission for the enterprise account.

The first client 120 can be a client installed in an end-user device of the current user. The second client 130 can be a client installed in an end-user device of the administrator. In the present specification, the end-user device can be any appropriate device in which an application can be installed in the art. For example, the end-user device can include a smartphone, a desktop computer, a laptop computer, a tablet device, a wearable device, etc.

The first client 120 and the second client 130 can cooperate with the server to perform identity verification on the user. For example, the server 110 can interact with the first client 120 and the second client 130. The server 110 can communicate with an end-user device in which each client is located by using various appropriate communications technologies, to interact with the corresponding client. For example, the server 110 can interact with the first client 120 to obtain identity information of the current user from the first client 120, and then perform identity verification on the current user. The server 110 can interact with the second client 130 to obtain identity information of the administrator from the second client 130, and then perform identity verification on the administrator. For example, the identity information can include biometric feature data and/or non-biometric feature data. The biometric feature data can include fingerprint data, facial data, iris data, etc. The non-biometric feature data can include a short message service message, a password, an identity card number, etc.

In some scenarios, the first client 120 can be the same as the second client 130. For example, the current user and the administrator can use the same end-user device to initiate a corresponding operation. In this case, the first client 120 can be the same as the second client 130. Therefore, in the present specification, the first client 120 and the second client 130 are classified only from an operational perspective.

In addition, the server 110 can further interact with the certificate authority 160. For example, the server 110 can obtain a digital certificate from the certificate authority 160, and send the digital certificate to the second client 130. The digital certificate can be used to prove authenticity of the administrator and a corresponding enterprise.

In addition, the first client 120 or the second client 130 can invoke a trusted environment of the corresponding end-user device, to perform various operations in the trusted environment. For example, the second client 130 can generate a digital signature based on the digital certificate in the trusted environment.

In addition, the server 110 can further interact with the service system 140. For example, the server 110 can interact with the service system 140, to transmit proxy permission information to the service system 140. As such, the service system 140 can determine, based on the proxy permission information, whether to authorize the current user to perform an operation. In addition, the service system 140 can further initiate a proxy authorization process to the server 110, to allocate operation permission to the authorized user.

The server 110 can further perform a read/write operation on the blockchain 150. For example, the server 110 can upload the proxy permission information to the blockchain 150, to ensure trustworthiness of the proxy permission information. The server 110 can further read the proxy permission information from the blockchain 150.

It is known that blockchain is a new distributed system. For example, the blockchain usually can be constructed based on a peer-to-peer network, stores and verifies data by using a chain data structure, ensures consistency of data update results by using a consensus protocol between distributed nodes, ensures tamper-resistance of the data and transmission and access security by using a cryptographic solution, and programs and operates data by using a smart contract that includes automated script code.

In the present specification, the blockchain 150 can be a public blockchain, a private blockchain, or a consortium blockchain. For example, the blockchain 150 can be based on various consensus algorithms such as a practical Byzantine fault tolerance (PBFT) algorithm.

In addition, the chain data structure can refer to a data organization form. For example, a state transition record (for example, which may also be referred to as a transaction) can be stored in a "block" in the form of a list, and a plurality of blocks can be arranged in a specific logical order. A "block header" of each block can include a hash value (which can be represented as preHash) that represents a previous block, a timestamp (which can be represented as timeStamp) for package of the block, a hash value (which can be represented as Hash(blockinfo)) of the block, and a number (which can be represented as height) of the block. In addition, the block can further include a root node of a Merkle tree (which can be represented as MerkleInfo_root), a leaf node, and a data block. The leaf node can include a hash value of a corresponding data block. The root node can include a hash value of a corresponding leaf node. In the present specification, the data block can be represented as Authinfo, and can be in a json format. For example, the data block can include the proxy permission information.

The proxy permission information can be associated with a corresponding authorized user. For example, the proxy permission information can include personal information of an administrator of an enterprise account, personal information of the authorized user, operation permission information, device information of an end-user device of the administrator, a private key signature of the administrator, digest information, an identity verification task identifier, an expiry time, a timestamp, an operation type, etc. The expiry time can represent a validity time of the proxy permission information. The operation type can include authorization or cancellation.

Figure 1B:
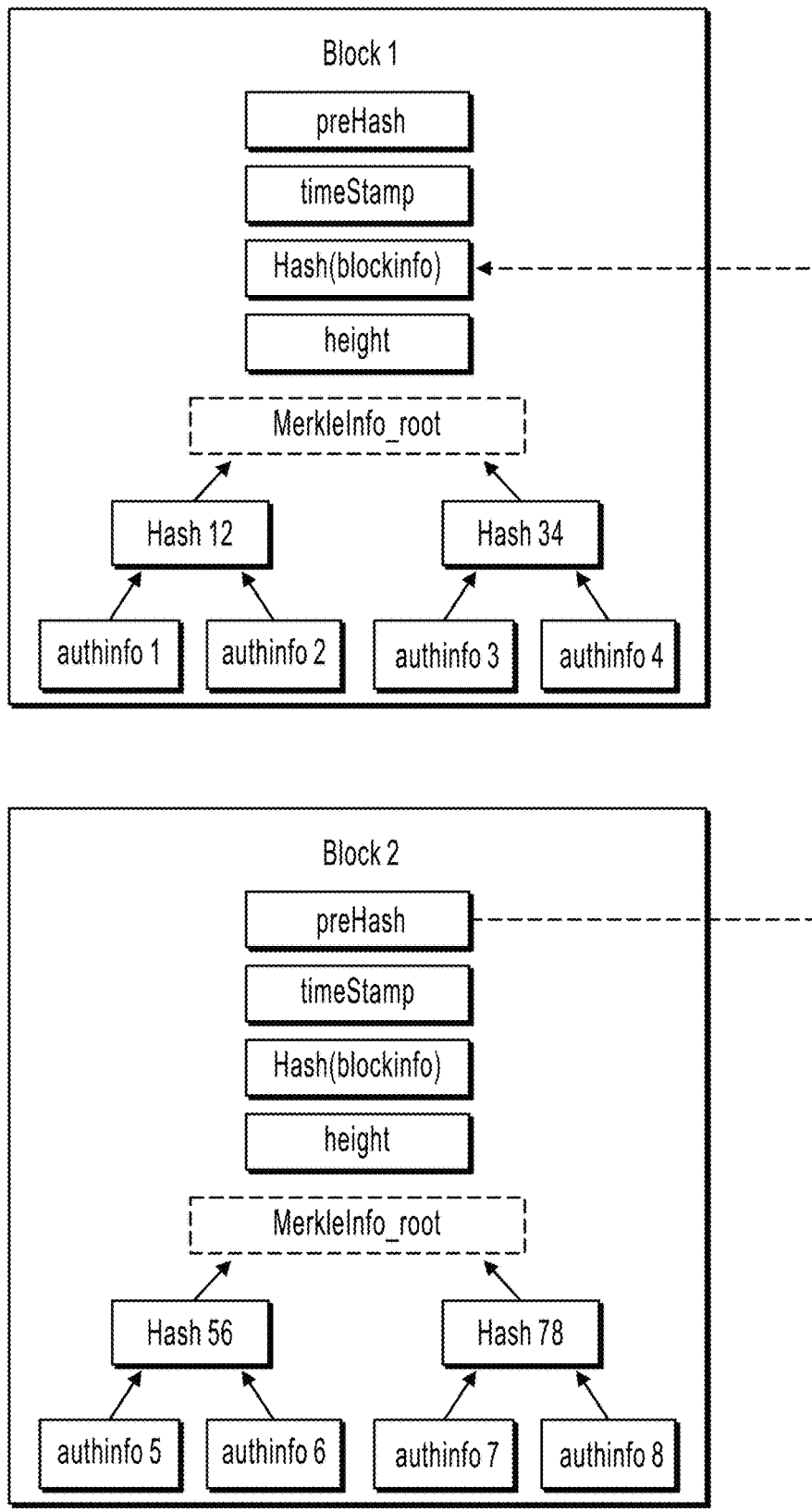
FIG. 1B is a schematic diagram illustrating an example of a structure of a blockchain, according to an implementation.

FIG. 1B is a schematic diagram illustrating an example of a structure of a blockchain, according to an implementation. In FIG. 1B, for ease of description, only two blocks, namely, block 1 and block 2, in the blockchain are shown. It should be understood that in practice, the blockchain can include more blocks. Implementations are not limited in the present specification. In addition, each block can include the previous content. Details are omitted here for simplicity.

Operations of the performers are described below with reference to specific implementations.

Figure 2A:
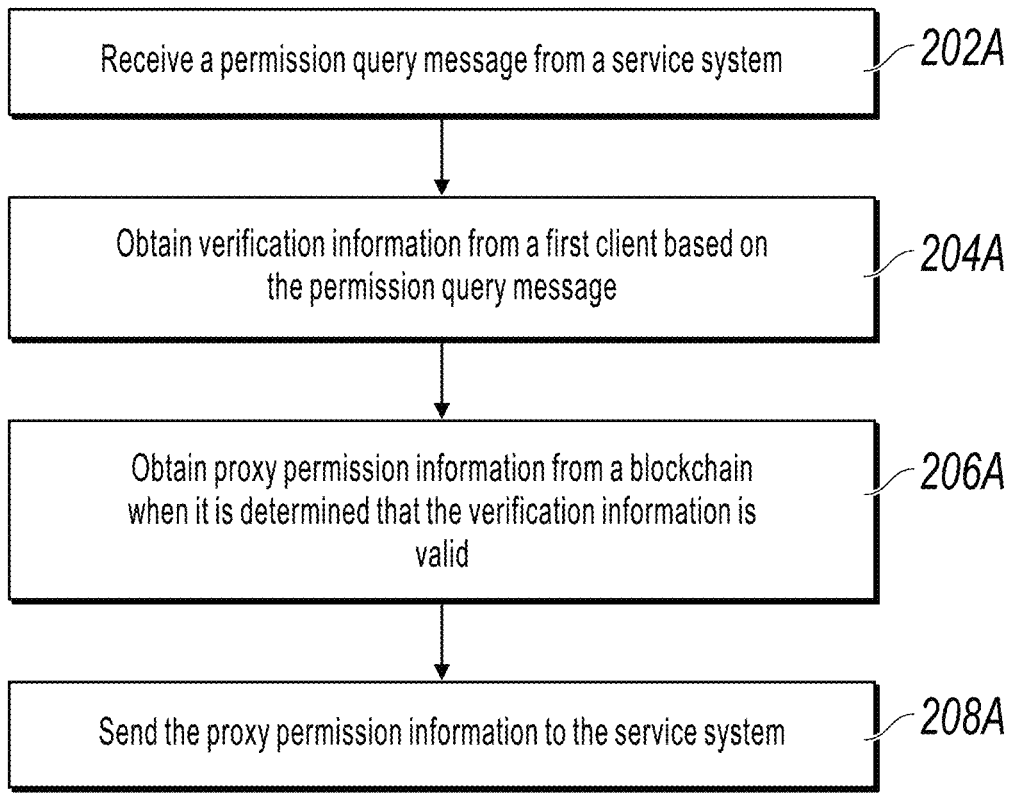
FIG. 2A is a schematic flowchart illustrating a method for account management, according to an implementation.

FIG. 2A is a schematic flowchart illustrating a method for account management, according to an implementation. The method in FIG. 2A can be performed by a server, for example, the server 110 shown in FIG. 1A.

Step 202A: The server can receive a permission query message from a service system, where the permission query message can be used to query operation permission of a current user for an enterprise account registered with the service system.

For example, when the current user performs an operation in the service system, the service system can send the permission query message to the server.

In step 204A, the server can obtain verification information from a first client based on the permission query message. The verification information can be associated with an identity of the current user.

For example, the first client can be installed in an end-user device used by the current user.

In step 206A, the server can obtain proxy permission information from a blockchain when it is determined that the verification information is valid.

For example, valid verification information can prove the identity of the current user. The proxy permission information can include at least operation permission information of the current user for the enterprise account, and operation permission indicated by the operation permission information can be specified by an administrator of the enterprise account. For example, the operation permission information can include an operation permission identifier set.

In step 208A, the server can send the proxy permission information to the service system.

It can be seen that in the technical solutions, identity verification on the current user who operates the enterprise account is performed to effectively control the risk of the enterprise account. Furthermore, the administrator specifies operation permission of an authorized user to allocate permission for the same account, and therefore the use of the same account can be fine-tuned. In addition, the proxy permission information is stored in the blockchain, and therefore it can be effectively ensured that the permission is trusted, thereby alleviating problems associated with a centralized node and access costs.

In an implementation, when receiving the permission query message from the service system, the server can communicate with the first client, to verify the identity of the current user. For example, the server can send permission query task information to the service system, and the permission query task information instructs to invoke the first client. As such, the service system can invoke the first client based on the permission query task information. For example, the service system can prompt the current user to scan a two-dimensional code by using the end-user device of the current user to start the first client. Alternatively, the service system pushes a message for starting the first client to the end-user device of the current user, and then starts the first client based on acknowledgement input of the current user.

The verification information can include an authorization code. In step 204A, the server can send an authorization instruction to the first client. The authorization instruction can be used to request the authorization code. For example, the authorization instruction can include a server time, an identifier of a channel, a challenge code, and a quantity of bits of the authorization code. The server then can receive the authorization code from the first client. The authorization code can be generated by the first client based on the authorization instruction and a client token. The channel can represent the use of the authorization code. For example, in the present specification, the channel can be used to represent that the authorization code is used to verify an identity. The challenge code can be a random code for ensuring security of a channel for sending the authorization instruction, for example, is used to place a request for replay and tampering.

For example, the authorization code can be generated based on an HMAC-based one-time password (HOTP) algorithm. For example, the authorization code can be generated by using the HOTP algorithm based on the client token, the identifier of the channel, the server time, the quantity of bits of the authorization code, and a value of the challenge code.

It can be seen that the identity of the current user can be effectively verified by using the authorization code, so that the risk of the enterprise account can be controlled.

The client token can be obtained by the first client from the server. For example, when the current user starts the first client in the end-user device of the current user for the first time, the first client can obtain the client token from the server. The client token can have valid period. When the client token is invalid, the first client can obtain a new client token from the server.

The process of sending the client token to the first client by the server is described below. In an implementation, the server can receive, from the first client, a token request message for requesting the client token. The server can obtain identity information of the current user from the first client based on the token request message. The server can determine, based on the identity information of the current user, that the current user is one of authorized users corresponding to the enterprise account. The server then can generate the client token, and send the client token to the first client. A channel of sending the client token can be encrypted and trusted.

Specifically, the server can query information about the authorized user from the blockchain based on an identifier of the administrator and a distributed key pair. For example, the identifier of the administrator can be included in the permission query message sent by the service system. In addition, the server can push an authorized user list to the first client. The first client can present the authorized user list to the current user, so that the current user selects the current user from the list. After the first client receives the input that the current user selects the current user from the list, the first client can obtain the identity information of the current user, for example, fingerprint data and facial data. The first client can send the identity information of the current user to the server.

The server can determine, based on the identity information of the current user, that the current user is actually one of the authorized users. The server then can generate the client token. For example, the server can generate the client token by using a digital signature function (sign) based on a private key of the server, the identity information of the current user, and a random number. For example, generation logic of the client token can be represented as the client token=sign(the private key of the server, hash (the identity information of the current user and the random number)). Here, hash can represent an HMAC function.

In an implementation, in step 206A, the server can determine that the verification information is valid. For example, the server can generate a local authorization code by using the same process as the first client. The server then can compare the generated local authorization code with the authorization code received from the first client. If the generated local authorization code is consistent with the authorization code received from the first client, the server can determine that the authorization code received from the first client is valid. Therefore, the server can determine that the identity of the current user is trusted.

The server then can obtain the proxy permission information from the blockchain. For example, the server can query all related blocks in the blockchain based on hash values of the blocks associated with the administrator, to obtain the proxy permission information for the current user. The hash value of the block can be recorded when the server uploads the proxy permission information to the blockchain.

The blockchain features decentralization and tamper-resistance, hence it can be ensured that the proxy permission information stored in the blockchain is trusted.

In addition, before step 202A, an initialization process for the administrator and a proxy authorization process can be performed first. The initialization process for the administrator can be used to perform identity verification on the administrator and send a digital certificate. The proxy authorization process can be used to implement designation for the authorized user by the administrator. The initialization process for the administrator is described below.

In an implementation, the server can receive an initialization request for the administrator from a second client. The second client can be installed in an end-user device used by the administrator. For example, when the second client is started for the first time in the end-user device used by the administrator, the second client can receive an input used by the administrator to initiate the initialization request. The second client can send the initialization request to the server based on the input.

The server can obtain initialization information based on the initialization request. For example, the server can obtain the initialization information from the second client or the related service system. For example, the initialization request sent by the second client can include the initialization information.

The initialization information can include information about the administrator and information about an associated enterprise. For example, the information about the administrator can include personal information of the administrator, for example, a name and an identity card number. The information about the administrator can further include device information of the end-user device used by the administrator, for example, a device identifier and device hardware information. The device identifier can be obtained by the second client based on the hardware information of the end-user device, and can be stored in a trusted execution environment (TEE). The device information can be used by the server to determine that the end-user device is trusted.

The information about the enterprise can include an identifier of the enterprise, a name of the enterprise, business license information of the enterprise, etc.

The server then can obtain identity information of the administrator from the second client when it is determined that the initialization information is valid.

For example, the server can verify correctness of the information about the enterprise and the personal information (such as, the identity card number) of the administrator based on an enterprise data source, and can generate identity verification task information when determining that the information about the enterprise and the personal information of the administrator are correct. The server can send the identity verification task information (for example, an identifier) to the second client. For example, the identity verification task information can instruct to obtain the identity information of the administrator. The second client can obtain the identity information of the administrator, for example, facial data and fingerprint data, based on the identity verification task information. The second client then can send the identity information of the administrator to the server.

The server then can perform identity verification on the administrator based on the identity information of the administrator.

After the identity verification on the administrator succeeds, the server can determine a digital certificate, and send the digital certificate to the second client. The digital certificate can be used to prove authenticity of the administrator and the enterprise.

For example, the server can send a certificate installation instruction to the second client. The second client can generate an asymmetric key, such as a public key and a private key, in the TEE based on the certificate installation instruction. For example, the second client can generate the asymmetric key based on an RSA/SM2 algorithm. The second client then can generate a certificate signing request (CSR). The CSR can include the public key, non-privacy information of the enterprise, private key signature information, etc. The private key signature information can be obtained by the second client by signing the public key by using the private key. The second client then can send the CSR to the server.

After receiving the CSR, the server can send certificate production information to a certificate authority (for example, the certificate authority 160 shown in FIG. 1A). The certificate production information can include the information included in the CSR and other related information. After generating the digital certificate, the certificate authority can send the digital certificate to the server. The server can send the digital certificate to the second client. The second client can write the digital certificate to the TEE. The digital certificate can include the public key, the non-privacy information of the enterprise, etc.

The proxy authorization process can be performed after the initialization process for the administrator.

In an implementation, the server can receive authorization management information from the service system. For example, the authorization management information can include at least the operation permission information and identification information of the service system.

For example, the administrator can initiate a proxy authorization request in the service system. After detecting the proxy authorization request of the administrator, the service system can send the authorization management information to the server. For example, the service system can send an authorization management request to the server, and the authorization management request can include the authorization management information. The authorization management information can include the identifier of the service system, the operation permission information, the information about the enterprise, and the device information of the end-user device used by the administrator. For example, the operation permission information can include an operation permission identifier set. The operation permission can be specified by the administrator in the service system.

The server can then communicate with the second client based on the authorization management information, to obtain the personal information of the current user from the second client. For example, the server can send authorization management task information to the service system, and the information can instruct to invoke the second client. The service system can start the second client by prompting the administrator to scan a two-dimensional code. Alternatively, the server can push a message for starting the second client to the end-user device of the administrator, and then can start the second client based on an acknowledgment input of the administrator.

The second client can receive the information about the authorized user that is input by the administrator. For example, the authorized user can include the current user. The input information can include the personal information of the current user, for example, a name, an identity card number, a mobile phone number, and a job of the current user. The second client can then send the personal information of the current user to the server.

The server can confirm the personal information of the current user. The server then can obtain the identity information of the administrator from the second client.

For example, the server can generate the identity verification task information, and the identity verification task information can instruct to obtain the identity information of the administrator. The server can send the identity verification task information to the second client. The second client can obtain the identity information of the administrator, for example, the facial data and the fingerprint data, based on the identity verification task information. The second client then can send the identity information of the administrator to the server.

The server can perform identity verification on the administrator based on the identity information of the administrator. After the identity verification on the administrator succeeds, the server can obtain signature information for digest information from the second client. The digest information can be generated based on at least the operation permission information and the personal information of the current user. The signature information can be generated by the second client based on the digital certificate.

For example, the server can generate the digest information after the identity verification on the administrator succeeds. For example, the server can generate the digest information by using an SHA256 algorithm. The digest information can be generated based on the following information: the personal information of the administrator, the personal information of the current user, the operation permission identifier set, the device information of the end-user device used by the administrator, the identity verification task information (for example, the identifier), the identity information of the administrator, a timestamp, etc.

The server can send the digest information to the second client. The second client can sign the digest information by using a local private key, to obtain the signature information. The second client then can send the signature information to the server.

After receiving the signature information, the server can verify the signature information by using a public key, and after the verification succeeds, can invoke a third-party timestamp service to record a current signature time.

The server can further generate the proxy permission information. The proxy permission information can include at least the operation permission information, the personal information of the current user, the digest information, the signature information, etc. For example, the proxy permission information can include the personal information of the administrator of the enterprise account, the personal information of the current user, the operation permission information, the device information of the end-user device of the administrator, the signature information, the digest information, the identity verification task information (for example, the identifier), an expiry time of the proxy permission information, a timestamp, an operation type, etc. The operation type can include authorization or cancellation. The operation permission information can be represented as the operation permission identifier set. The proxy permission information can be in a format that can be stored in the blockchain. In addition, the server can further encrypt the proxy permission information, for example, encrypt the proxy permission information by using a master key and a distributed key, and then upload the proxy permission information to the blockchain. The server can record a hash value of a block that stores the proxy permission information for subsequent query. For example, in step 206A, the corresponding proxy permission information is queried from the blockchain.

In addition, the server can further upload blockchain information and the digest information to a third-party certification institution, so that the third-party certification institution performs filing, to enhance the legal effect.

It can be understood that the first client and the second client can refer to clients installed on different end-user devices, or can refer to the same client installed on the same end-user device. For example, the authorized user and the administrator can perform a service operation by using the same end-user device. In this case, the first client and the second client can refer to a client installed in the end-user device. Therefore, the first client and the second client are actually classified from an operational perspective.

The technical solutions of the present specification are described above from the perspective of the server. Description is provided below from the perspective of a first client.

Figure 2B:
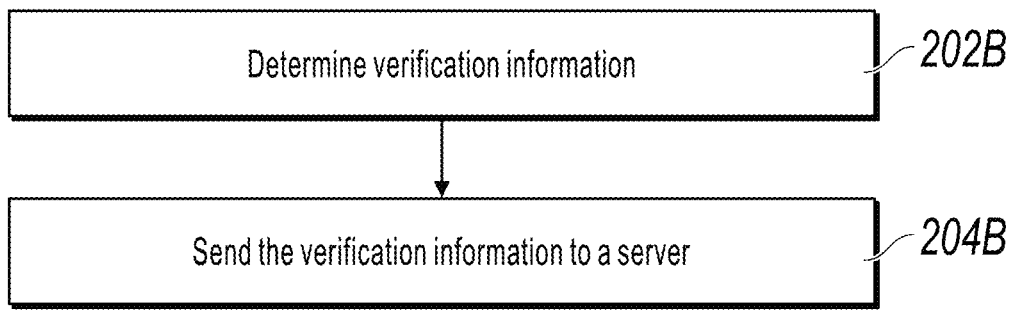
FIG. 2B is a schematic flowchart illustrating a method for account management, according to an implementation.

FIG. 2B is a schematic flowchart illustrating a method for account management, according to an implementation. The method in FIG. 2B can be performed by a first client, and the first client can be installed in an end-user device used by a current user. The current user can be for an enterprise account registered with a service system. For example, the first client can be the first client 120 shown in FIG. 1A.

It should be understood that for brevity of description, aspects similar to those in FIG. 2A are omitted in FIG. 2B.

As shown in FIG. 2B, in step 202B, the first client can determine verification information, where the verification information can be associated with an identity of the current user.

In step 204B, the first client can send the verification information to a server, so that the server verifies the identity of the current user.

It can be seen that in the technical solutions, the verification information used to prove the identity of the current user is sent to the server, so that the server can effectively verify the identity of the current user in the service system, to control the risk of the enterprise account.

In an implementation, the verification information can include an authorization code. In step 202B, the first client can receive an authorization instruction from the server, where the authorization instruction can be used to request the authorization code. The first client can generate the authorization code based on the authorization instruction and a client token.

For example, after receiving a permission query message for the current user from the service system, the server can send the authorization instruction to the first client.

The client token can be obtained by the first client from the server. For example, when the first client is started in the end-user device of the current user for the first time, the first client can obtain the client token from the server. The client token can have a valid period. When the client token expires, the first client can obtain a new client token from the server.

In an implementation, the first client can send a token request message for requesting the client token to the server. The first client can receive an identity verification request for the current user from the server. For example, the identity verification request can include identity verification task information. The first client can obtain identity information of the current user, for example, facial data and fingerprint data, based on the identity verification request.

The first client can send the identity information of the current user to the server, so that the server determines that the current user is one of authorized users corresponding to the enterprise account. The first client then can receive the client token generated by the server from the server.

The technical solutions of the present specification are described above from the perspective of the first client. An initialization process for an administrator and a proxy authorization process are described below from the perspective of a second client.

Figure 2C:
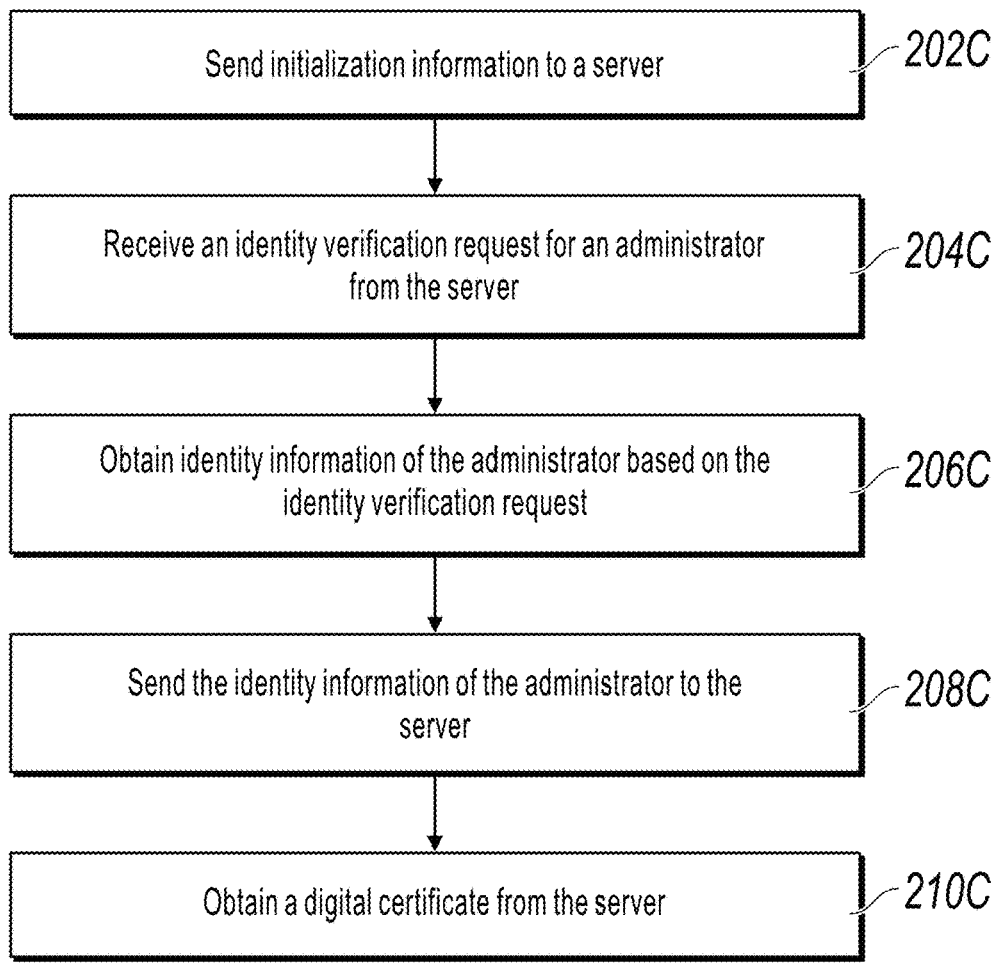
FIG. 2C is a schematic flowchart illustrating a method for account management, according to an implementation.

FIG. 2C is a schematic flowchart illustrating a method for account management, according to an implementation. The method in FIG. 2C can be performed by a second client installed in an end-user device used by an administrator. The administrator can be for an enterprise account registered with a service system. For example, the second client can be the second client 130 shown in FIG. 1A.

As shown in FIG. 2C, in step 202C, when the administrator initiates an initialization request by using the end-user device, the second client can send initialization information to a server. The initialization information can include personal information of the administrator, device information of the end-user device, and information about an enterprise associated with the enterprise account.

For example, the personal information can include a name, an identity card number, etc. of the administrator. The device information can include a device identifier, device hardware information, etc. The information about the enterprise can include an identifier of the enterprise, a name of the enterprise, business license information of the enterprise, etc.

In step 204C, the second client can receive an identity verification request for the administrator from the server.

For example, the identity verification request can include identity verification task information.

In step 206C, the second client can obtain identity information of the administrator, for example, facial data and fingerprint data, based on the identity verification request.

In step 208C, the second client can send the identity information of the administrator to the server, so that the server performs identity verification on the administrator.

In step 210C, the second client can obtain a digital certificate from the server. The digital certificate can be sent by the server after the identity verification on the administrator succeeds, and the digital certificate can be used to prove authenticity of the administrator and the enterprise.

For example, the second client can receive a certificate installation instruction from the server. The second client can generate an asymmetric key, such as a public key and a private key, in a TEE based on the certificate installation instruction and RSA/SM2. The second client then can generate a CSR, and the CSR can include the public key, private key signature information, non-privacy information of the enterprise, etc. The second client then can send the CSR to the server. The server can send the CSR and other related information to a certificate authority, so that the certificate authority generates the digital certificate. The server can send the digital certificate generated by the certificate authority to the second client. The second client can write the digital certificate to the TEE.

It can be seen that in the technical solutions, identity verification on the administrator is performed and the digital certificate is obtained, so that it can be ensured that a subsequent process is performed in a trusted environment, to effectively control the risk of the enterprise account.

In an implementation, the proxy authorization process can be performed after initialization for the administrator.

Specifically, the second client can obtain personal information of a current user. For example, the personal information of the current user can be input by the administrator by using the end-user device of the administrator.

The second client can send the personal information of the current user to the server. For example, the server can confirm the personal information of the current user. The second client then can receive the identity verification request for the administrator from the server. For example, the identity verification request can include the identity verification task information.

The second client can obtain the identity information of the administrator based on the identity verification request. For example, the second client can obtain the facial data, the fingerprint data, etc. of the administrator. The second client can send the identity information of the administrator to the server, so that the server performs identity verification on the administrator. As described above, the personal information of the current user can be used by the server to generate proxy permission information after the identity verification on the administrator succeeds. The proxy permission information can include at least operation permission information of the current user for the enterprise account. For example, as described above, the proxy permission information can include the personal information of the administrator, the personal information of the current user, an operation permission identifier set, a timestamp, etc.

The initialization process for the administrator and the proxy authorization process are described above from the perspective of the second client. Description is provided below from the perspective of a service system.

Figure 2D:
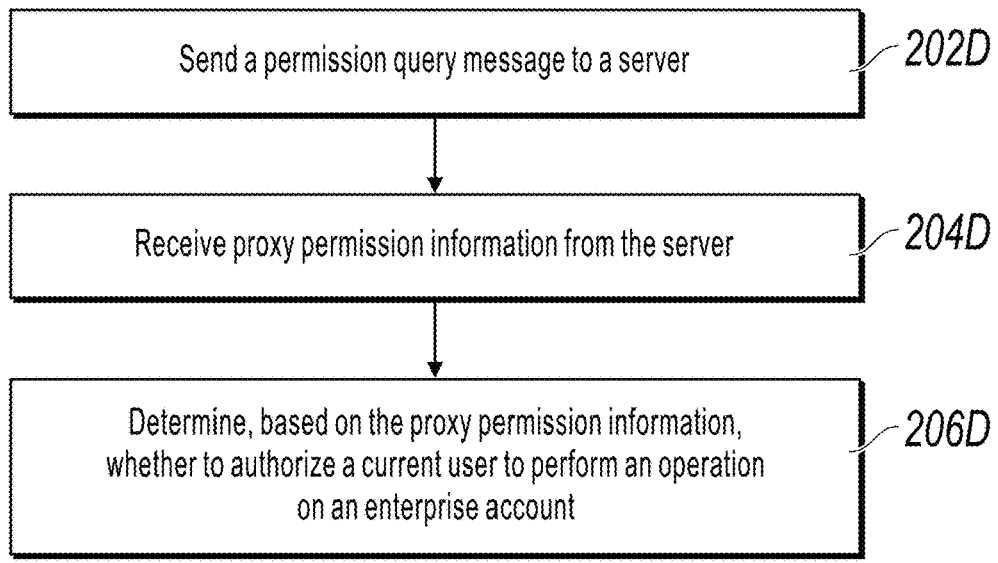
FIG. 2D is a schematic flowchart illustrating a method for account management, according to an implementation.

FIG. 2D is a schematic flowchart illustrating a method for account management, according to an implementation. The method in FIG. 2D can be performed by a service system, for example, the service system 140 shown in FIG. 1A.

As shown in FIG. 2D, in step 202D, when a current user operates an enterprise account registered with the service system, the service system can send a permission query message to a server. The permission query message can be used to query operation permission of the current user for the enterprise account.

In step 204D, the service system can receive proxy permission information from the server.

The proxy permission information is obtained by the server from a blockchain after identity verification on the current user succeeds. The proxy permission information can include at least operation permission information of the current user for the enterprise account.

In step 206D, the service system can determine, based on the proxy permission information, whether to authorize the current user to perform an operation on the enterprise account.

It can be seen that in the technical solutions, the server performs identity verification on the current user who operates the enterprise account to effectively control the risk of the enterprise account. Furthermore, the administrator specifies operation permission of an authorized user to allocate permission for the same account, and therefore the use of the same account can be fine-tuned. In addition, the proxy permission information is stored in the blockchain, and therefore it can be effectively ensured that the permission is trusted, thereby alleviating problems associated with a centralized node and access costs.

In an implementation, the proxy authorization process can be initiated by the administrator by using the service system. For example, the administrator can specify operation permission of an authorized user by using the service system. Correspondingly, the service system can determine authorization management information. The authorization management information can include the operation permission information and identification information of the service system. The service system can send the authorization management information to the server. For example, the service system can send an authorization management request to the server, and the authorization management request can include the authorization management information. As described above, the server can determine the proxy permission information based on the authorization management information, and upload the proxy permission information to the blockchain.

It can be seen from the previous description that the technical solutions of the present specification can involve three processes: an initialization process for an administrator, a proxy authorization process, and a verification process for a current user. The processes are described below with reference to specific examples. It should be understood that the following examples are merely illustrative, and are not intended to limit the scope of the technical solutions of the present specification.

Figure 3A:
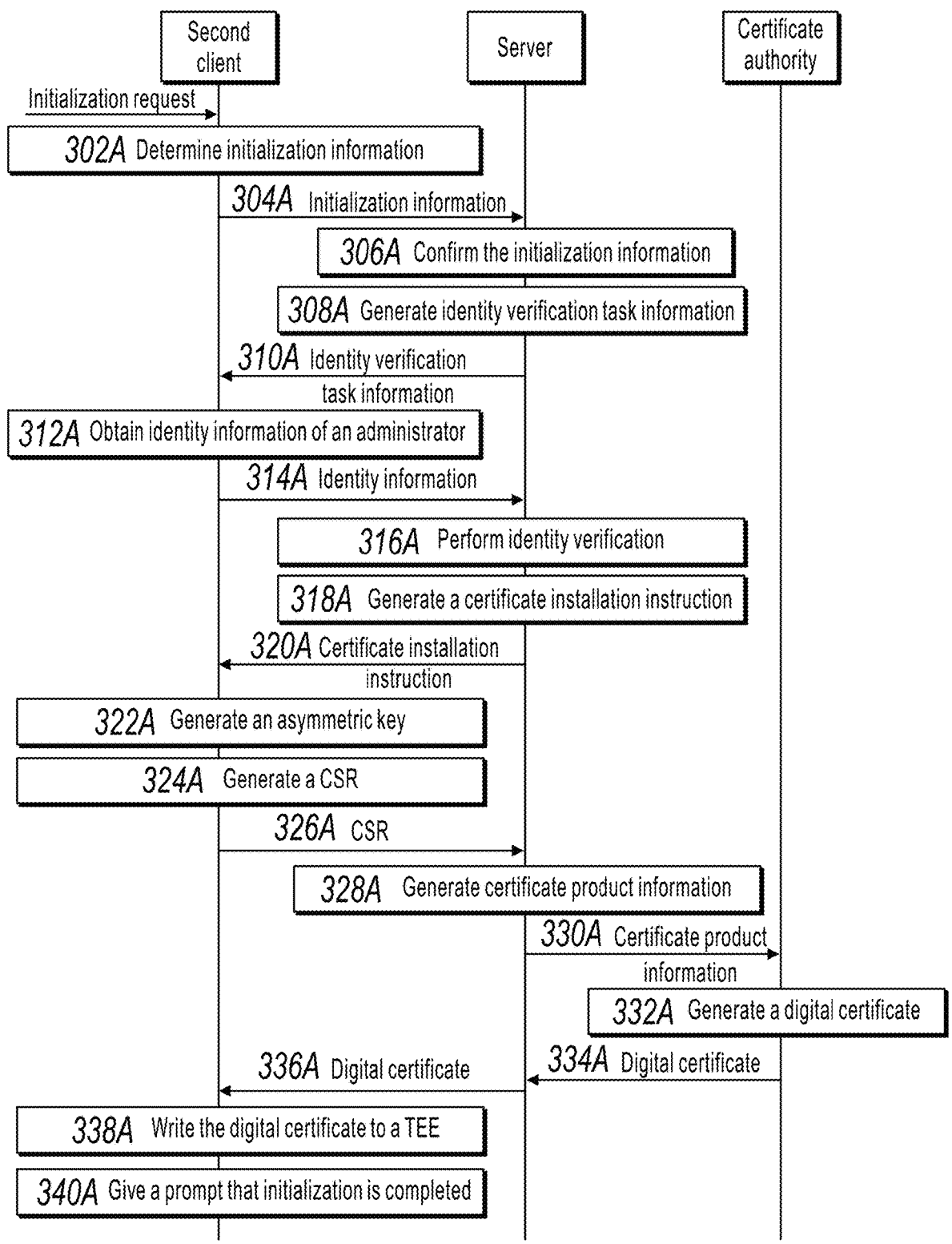
FIG. 3A is a schematic flowchart illustrating an initialization process for an administrator, according to an implementation.

FIG. 3A is a schematic flowchart illustrating an initialization process for an administrator, according to an implementation.

As shown in FIG. 3A, when the administrator for an enterprise account registered with a service system starts for the first time a second client installed in an end-user device of the administrator, the administrator can initiate an initialization request. Alternatively, the second client can present a dialog box for initiating an initialization request to the administrator. For example, the second client can detect an input used by the administrator to initiate an initialization request, and then determine to perform an initialization process.

In step 302A, the second client can determine initialization information.

For example, the initialization information can include personal information of the administrator, device information of the end-user device of the administrator, and information about an enterprise associated with the enterprise account.

In step 304A, the second client can send the initialization information to a server.

For example, the second client can send the initialization request to the server, and the initialization request can include the initialization information.

In step 306A, the server can confirm the initialization information.

For example, the server can confirm, based on an enterprise data source, that the personal information of the administrator and the information about the enterprise are correct.

In step 308A, the server can generate identity verification task information.

For example, the identity verification task information can indicate identity information to be obtained.

In step 310A, the server can send the identity verification task information to the second client.

In step 312A, the second client can obtain identity information of the administrator.

In step 314A, the second client can send the identity information of the administrator to the server.

In step 316A, the server can perform identity verification on the administrator.

In step 318A, the server can generate a certificate installation instruction after the identity verification on the administrator succeeds.

In step 320A, the server can send the certificate installation instruction to the second client.

In step 322A, the second client can generate an asymmetric key, such as a public key and a private key, in a TEE based on the certificate installation instruction.

In step 324A, the second client can generate a CSR.

For example, the CSR can include the public key, non-privacy information of the enterprise, private key signature information, etc.

In step 326A, the second client can send the CSR to the server.

In step 328A, the server can generate certificate production information.

For example, the certificate production information can include the information included in the CSR and other related information.

In step 330A, the server can send the certificate production information to a certificate authority.

In step 332A, the certificate authority can generate the digital certificate based on the certificate production information.

The digital certificate can be used to prove authenticity of the administrator and the enterprise.

In step 334A, the certificate authority can send the digital certificate to the server.

In step 336A, the server can send the digital certificate to the second client.

In step 338A, the second client can write the received digital certificate to the TEE.

In step 340A, the second client can prompt the administrator that initialization is completed.

It can be seen that the server performs identity verification on the administrator and sends the digital certificate, so that it can be ensured that a subsequent process is performed in a trusted environment, to effectively control the risk of the enterprise account.

Figure 3B:
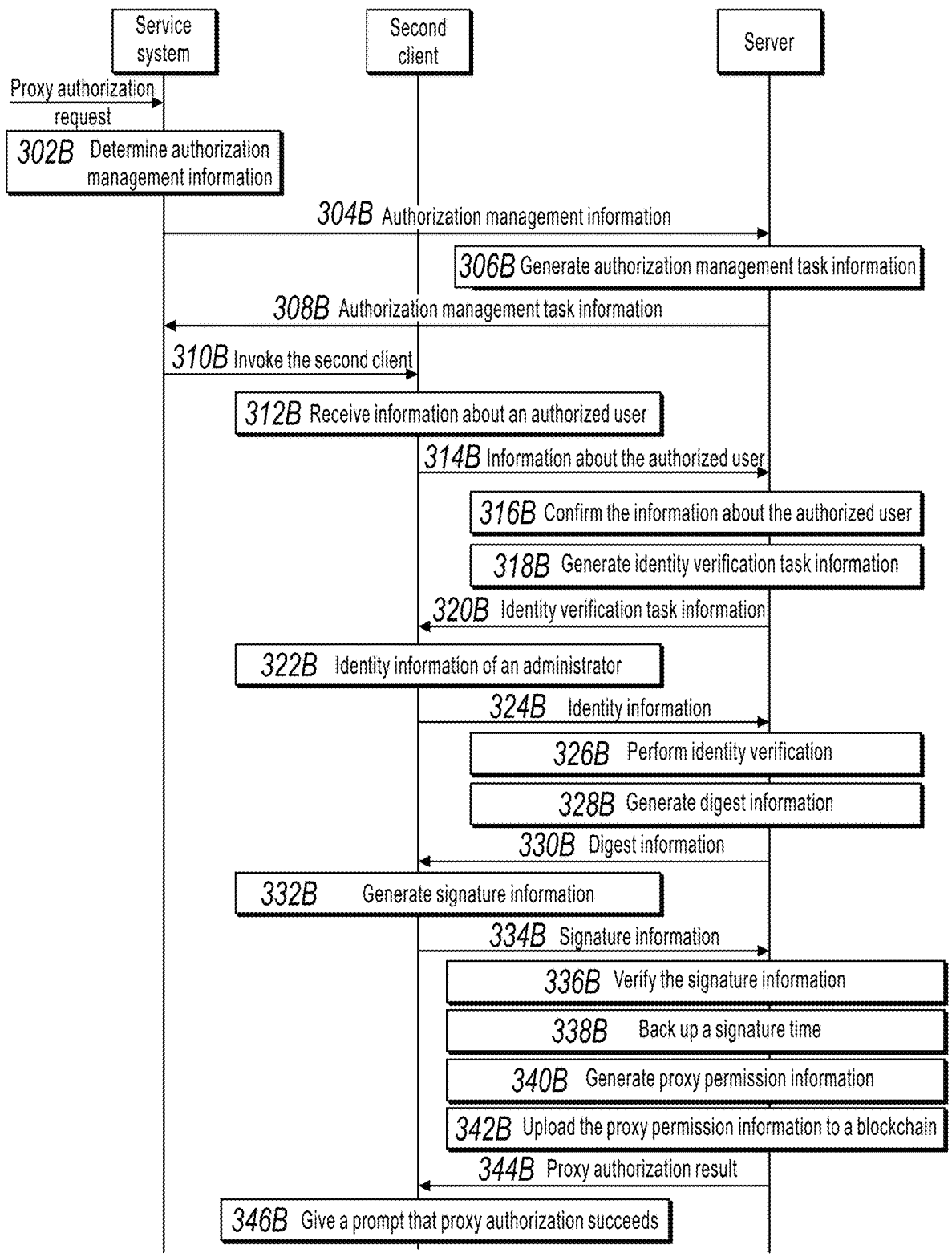
FIG. 3B is a schematic flowchart illustrating a proxy authorization process, according to an implementation.

FIG. 3B is a schematic flowchart illustrating a proxy authorization process, according to an implementation.

As shown in FIG. 3B, an administrator can initiate a proxy authorization request by using a service system. The administrator can be for an enterprise account registered with the service system. For example, the administrator can initiate the proxy authorization request to a service client of the service system by using an end-user device of the administrator. After detecting the proxy authorization request of the administrator, the service system can initiate a proxy authorization process.

In step 302B, the service system can determine authorization management information.

For example, the authorization management information can include an identifier of the service system, operation permission information, information about an enterprise associated with the enterprise account, device information of the end-user device of the administrator, etc. Operation permission indicated by the operation permission information can be specified by the administrator in the service system.

In step 304B, the service system can send the authorization management information to a server.

For example, the service system can send an authorization management request to the server, and the authorization management request can include the authorization management information.

In step 306B, the server can generate authorization management task information based on the authorization management information.

For example, the authorization management task information can instruct to invoke a second client.

In step 308B, the server can send the authorization management task information to the service system.

In step 310B, the service system can invoke the second client, to start the second client.

In step 312B, the second client can receive information about an authorized user that is input by the administrator.

In step 314B, the second client can send the information about the authorized user to the server.

In step 316B, the server can confirm the information about the authorized user.

In step 318B, the server can generate identity verification task information.

For example, the identity verification task information can instruct to obtain identity information of the administrator.

In step 320B, the server can send the identity verification task information to the second client.

In step 322B, the second client can obtain the identity information of the administrator based on the identity verification task information.

In step 324B, the second client can send the identity information of the administrator to the server.

In step 326B, the server can perform identity verification on the administrator based on the identity information of the administrator.

In step 328B, the server generates digest information after the identity verification on the administrator succeeds.

For example, the server can obtain the digest information by using a digest algorithm based on personal information of the administrator, personal information of the authorized user, an operation permission identifier set, the device information of the end-user device of the administrator, an identity verification task identifier, the identity information of the administrator, and a timestamp.

In step 330B, the server can send the digest information to the second client.

In step 332B, the second client can sign the digest information in a TEE by using a private key, to obtain signature information.

In step 334B, the second client can send the signature information to the server.

In step 336B, the server can verify the signature information based on a public key.

In step 338B, the server can invoke a third-party timestamp service after the verification on the signature information succeeds, to back up a current signature time.

In step 340B, the server can generate proxy permission information. For example, the proxy permission information can be in a message format applicable to a blockchain.

In step 342B, the server can encrypt the proxy permission information, for example, encrypt the proxy permission information by using a master key and a distributed key. In addition, the server can upload the encrypted proxy permission information to the blockchain, and record a hash value of a current block.

In step 344B, the server can return a proxy authorization result to the second client. For example, the proxy authorization result can indicate that proxy authorization succeeds.

In step 346B, the second client can prompt the administrator that proxy authorization succeeds.

It can be seen that in the technical solutions, the administrator of the enterprise account specifies operation permission of an authorized user, so that the use of the same account can be fine-tuned. In addition, the proxy permission information is uploaded to the blockchain, so that reliability of the proxy permission information can be ensured.

A verification process for a current user of an enterprise account is described below.

Figure 3C:
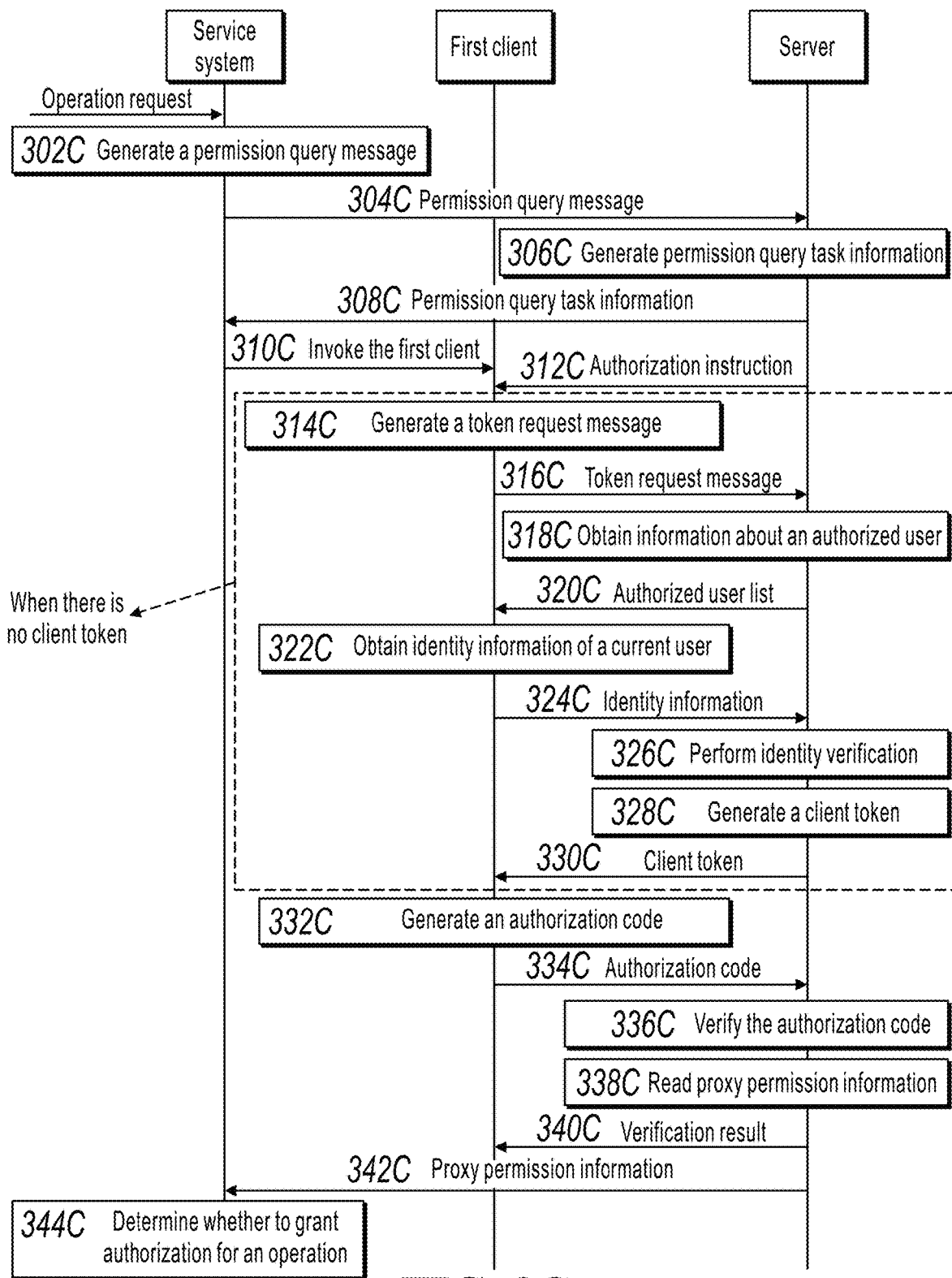
FIG. 3C is a schematic flowchart illustrating a verification process for a current user of an enterprise account, according to an implementation.

FIG. 3C is a schematic flowchart illustrating a verification process for a current user of an enterprise account, according to an implementation.

As shown in FIG. 3C, an enterprise account can be registered in a service system. A current user can perform a service operation based on the enterprise account. When detecting that the current user is performing an operation, the service system can initiate a verification process for the current user.

In step 302C, the service system can generate a permission query message. The permission query message can be used to query operation permission of the current user for the enterprise account.

In step 304C, the service system can send the permission query message to a server.

In step 306C, the server can generate permission query task information based on the permission query message.

For example, the permission query task information can instruct to invoke a first client. The first client can be installed in an end-user device of the current user.

In step 308C, the server can send the permission query task information to the service system.

In step 310C, the service system can invoke the first client, to start the first client.

In step 312C, the server can send an authorization instruction to the first client.

If the first client has a valid client token, steps 314C to 330C can be skipped. In step 332C, the first client can generate an authorization code based on the authorization instruction and the client token.

If the first client has no valid client token, for example, when the first client is started for the first time or the client token is invalid, steps 314C to 330C can be performed, so that the first client obtains a valid client token from the server.

In step 314C, the first client can generate a token request message for requesting a client token.

In step 316C, the first client can send the token request message to the server.

In step 318C, the server can obtain information about an authorized user.

For example, the server can obtain the information about the authorized user from a blockchain based on personal information of an administrator and a distributed key.

In step 320C, the server can send an authorized user list to the first client.

In step 322C, the first client can present the authorized user list to the current user, to receive an input used by the current user to select the current user from the list. The first client then can obtain identity information of the current user.

In step 324C, the first client can send the identity information of the current user to the server.

In step 326C, the server can perform identity verification on the current user based on the identity information of the current user.

In step 328C, the server can generate the client token after the identity verification on the current user succeeds.

In step 330C, the server can send the client token to the first client.

After the client token is obtained, in step 332C, the first client can generate the authorization code based on the authorization instruction and the client token.

In step 334C, the first client can send the authorization code to the server.

In step 336C, the server can verify the authorization code.

In step 338C, the server can read proxy permission information from the blockchain after the verification on the authorization code succeeds.

Optionally, in step 340C, the server can return a verification result to the first client. For example, the verification result can indicate that the verification on the authorization code succeeds.

In addition, the first client can prompt the current user that the verification on the authorization code succeeds.

In step 342C, the server can send the proxy permission information to the service system.

In step 344C, the service system can determine, based on the proxy permission information, whether to authorize the current user to perform an operation on the service system.

It can be seen that in the technical solutions, identity verification on the current user who operates the enterprise account is performed to effectively control the risk of the enterprise account. Furthermore, the administrator specifies operation permission of an authorized user to allocate permission for the same account, and therefore the use of the same account can be fine-tuned. In addition, the proxy permission information is stored in the blockchain, and therefore it can be effectively ensured that the permission is trusted, thereby alleviating problems associated with a centralized node and access costs.

Figure 4A:
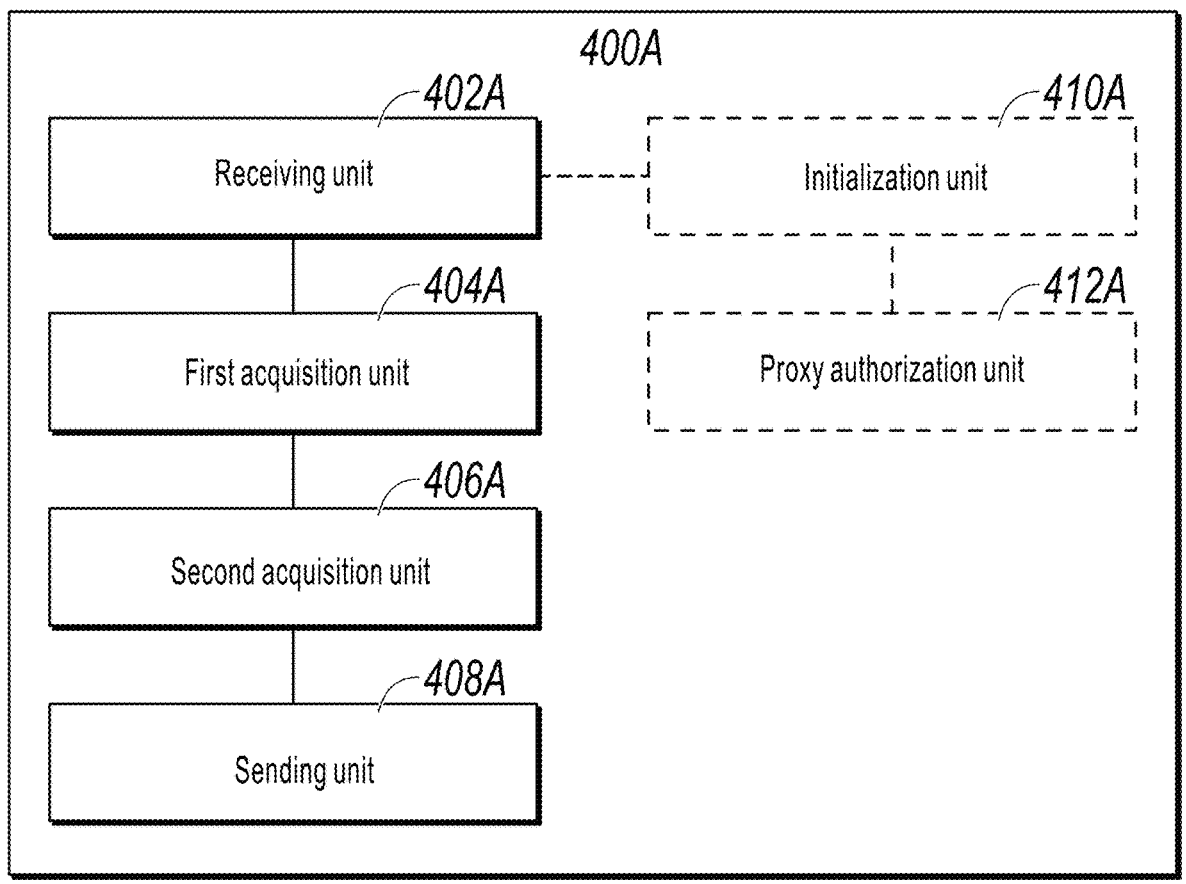
FIG. 4A is a schematic block diagram illustrating a server, according to an implementation.

FIG. 4A is a schematic block diagram illustrating a server, according to an implementation. For example, the server 400A in FIG. 4A can be the server 110 in FIG. 1A.

The server 400A can include a receiving unit 402A, a first acquisition unit 404A, a second acquisition unit 406A, and a sending unit 408A.

The receiving unit 402A can receive a permission query message from a service system. The permission query message is used to query operation permission of a current user for an enterprise account registered with the service system.

The first acquisition unit 404A can obtain verification information from a first client based on the permission query message. The first client is installed in an end-user device used by the current user, and the verification information is associated with an identity of the current user.

The second acquisition unit 406A can obtain proxy permission information from a blockchain when it is determined that the verification information is valid. The proxy permission information includes at least operation permission information of the current user for the enterprise account, and operation permission indicated by the operation permission information is specified by an administrator of the enterprise account.

The sending unit 408A can send the proxy permission information to the service system.

It can be seen that in the technical solutions, identity verification on the current user who operates the enterprise account is performed to effectively control the risk of the enterprise account. Furthermore, the administrator specifies operation permission of an authorized user to allocate permission for the same account, and therefore the use of the same account can be fine-tuned. In addition, the proxy permission information is stored in the blockchain, and therefore it can be effectively ensured that the permission is trusted, thereby alleviating problems associated with a centralized node and access costs.

In an implementation, the verification information can include an authorization code.

The first acquisition unit 404A can send an authorization instruction to the first client, where the authorization instruction is used to request the authorization code. The first acquisition unit 404A can receive the authorization code from the first client, where the authorization code is generated by the first client based on the authorization instruction and a client token, and the client token is obtained by the first client from the server.

In an implementation, the first acquisition unit 404A can perform the following operations before receiving the authorization code from the first client: receiving, from the first client, a token request message for requesting the client token; obtaining identity information of the current user from the first client based on the token request message; determining, based on the identity information of the current user, that the current user is one of authorized users corresponding to the enterprise account, where information about the authorized user is obtained from the blockchain; generating the client token; and sending the client token to the first client.

In an implementation, the server 400A can further include an initialization unit 410A. The initialization unit 410A can perform the following operations before the receiving unit 402A receives the permission query message from the service system: obtaining initialization information when an initialization request for the administrator is received from a second client, where the second client is installed in an end-user device used by the administrator, and the initialization information includes personal information of the administrator, device information of the end-user device used by the administrator, and information about an enterprise associated with the enterprise account; obtaining identity information of the administrator from the second client when it is determined that the initialization information is valid; performing identity verification on the administrator based on the identity information of the administrator; determining a digital certificate after the identity verification on the administrator succeeds, where the digital certificate is used to prove authenticity of the administrator and the enterprise; and sending the digital certificate to the second client.

In an implementation, the server 400A can further include a proxy authorization unit 412A. The proxy authorization unit 412A can perform the following operations after the initialization unit 410A sends the data certificate to the second client: receiving authorization management information from the service system, where the authorization management information includes the operation permission information and an identifier of the service system; obtaining personal information of the current user from the second client based on the authorization management information, where the personal information of the current user is input by the administrator; obtaining the identity information of the administrator from the second client; performing identity verification on the administrator based on the identity information of the administrator; obtaining signature information for digest information from the second client after the identity verification on the administrator succeeds, where the digest information is generated based on at least the operation permission information and the personal information of the current user, and the signature information is generated by the second client based on the digital certificate; generating the proxy permission information, where the proxy permission information includes at least the operation permission information, the personal information of the current user, the digest information, and the signature information; and uploading the proxy permission information to the blockchain.

The units of the apparatus 400A can perform the process described for the server in the method implementations in FIG. 1A to FIG. 3C. Therefore, for brevity of description, specific operations and functions of the units of the apparatus 400A are omitted here.

The apparatus 400A can be implemented by using hardware, software, or a combination of software and hardware. For example, when the apparatus 400A is implemented by using software, the apparatus 400A can be formed by reading, by using a processor of a device in which the apparatus 400A is located, a corresponding executable instruction from a memory (for example, a nonvolatile memory), and running the corresponding executable instruction in a storage.

Figure 4B:
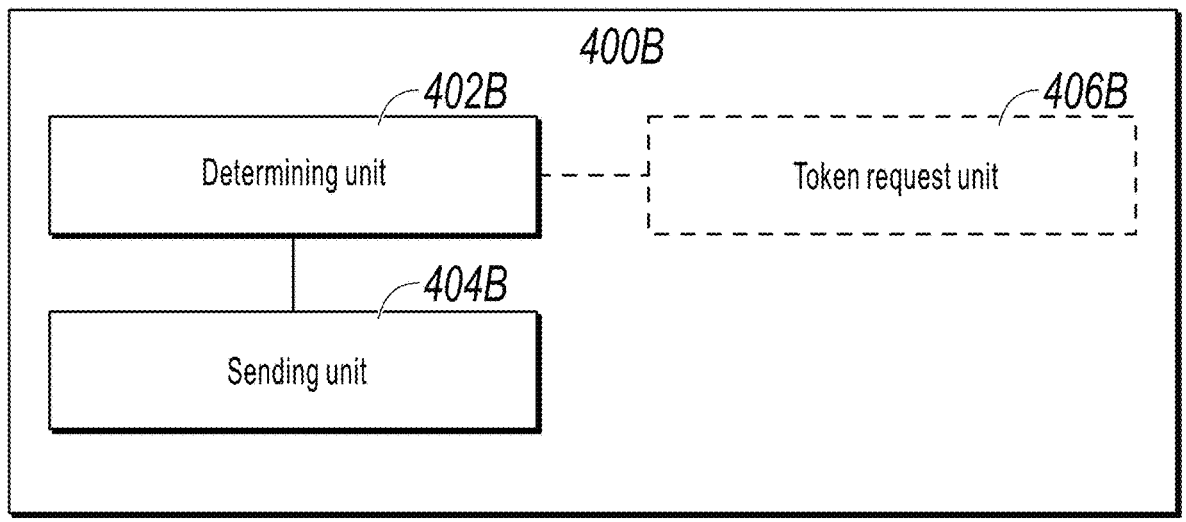
FIG. 4B is a schematic block diagram illustrating a first client apparatus, according to an implementation.

FIG. 4B is a schematic block diagram illustrating a first client apparatus, according to an implementation.

The first client apparatus 400B can be located in an end-user device used by a current user. The current user can be for an enterprise account registered with a service system. For example, the first client apparatus 400B can correspond to the first client 120 in FIG. 1A.

As shown in FIG. 4B, the first client apparatus 400B can include a determining unit 402B and a sending unit 404B.

The determining unit 402B can determine verification information. The verification information is associated with an identity of the current user.

The sending unit 404B can send the verification information to a server, so that the server verifies the identity of the current user.

It can be seen that in the technical solutions, the verification information used to verify the identity of the current user is sent to the server, so that the server can effectively verify the identity of the current user in the service system, to control the risk of the enterprise account.

In an implementation, the verification information can include an authorization code. The determining unit 402B can receive an authorization instruction from the server, where the authorization instruction is used to request the authorization code. The determining unit 402B can generate the authorization code based on the authorization instruction and a client token, where the client token is obtained from the server.

In an implementation, the first client apparatus 400B can further include a token request unit 406B.

The token request unit 406B can perform the following operations before the determining unit 402B generates the authorization code: sending, to the server, a token request message for requesting the client token; receiving an identity verification request for the current user from the server; obtaining identity information of the current user based on the identity verification request; sending the identity information of the current user to the server, so that the server determines that the current user is one of authorized users corresponding to the enterprise account; and receiving the client token from the server.

The units of the apparatus 400B can perform the process described for the first client in the method implementations in FIG. 1A to FIG. 3C. Therefore, for brevity of description, specific operations and functions of the units of the apparatus 400B are omitted here.

The apparatus 400B can be implemented by using hardware, software, or a combination of software and hardware. For example, when the apparatus 400B is implemented by using software, the apparatus 400B can be formed by reading, by using a processor of a device in which the apparatus 400B is located, a corresponding executable instruction from a memory (for example, a nonvolatile memory), and running the corresponding executable instruction in a storage.

Figure 4C:
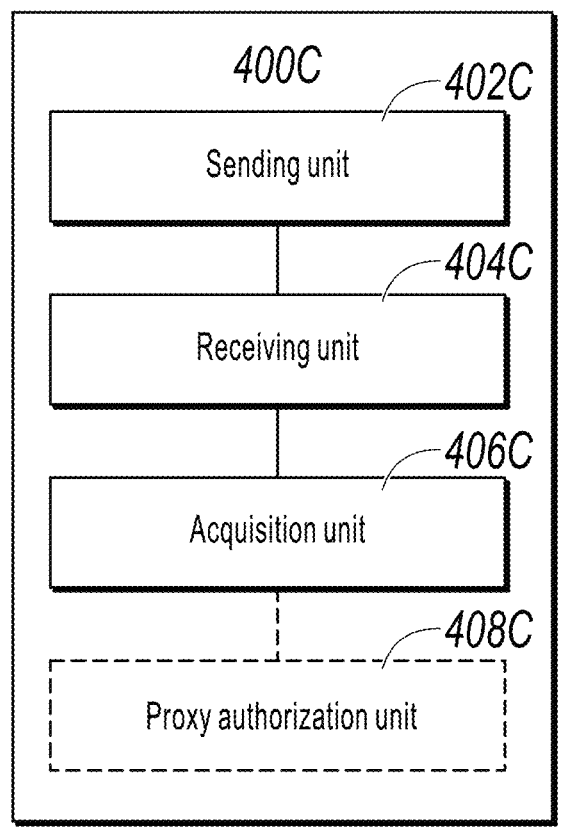
FIG. 4C is a schematic block diagram illustrating a second client apparatus, according to an implementation.

FIG. 4C is a schematic block diagram illustrating a second client apparatus, according to an implementation.

The second client apparatus 400C can be located in an end-user device used by an administrator. The administrator can be for an enterprise account registered with a service system. For example, the second client apparatus 400C can correspond to the second client 130 in FIG. 1A.

As shown in FIG. 4C, the second client apparatus 400C can include a sending unit 402C, a receiving unit 404C, and an acquisition unit 406C.

The sending unit 402C can send initialization information to a server when the administrator initiates an initialization request by using the end-user device. The initialization information includes personal information of the administrator, device information of the end-user device, and information about an enterprise associated with the enterprise account.

The receiving unit 404C can receive an identity verification request for the administrator from the server.

The acquisition unit 406C can obtain identity information of the administrator based on the identity verification request.

The sending unit 402C can further send the identity information to the server, so that the server performs identity verification on the administrator.

The acquisition unit 406C can further obtain a digital certificate from the server. The digital certificate is sent by the server after the identity verification on the administrator succeeds, and the digital certificate is used to prove authenticity of the administrator and the enterprise.

It can be seen that in the technical solutions, identity verification on the administrator is performed and the digital certificate is obtained, so that it can be ensured that a subsequent process is performed in a trusted environment, to effectively control the risk of the enterprise account.

In an implementation, the second client apparatus 400C can further include a proxy authorization unit 408C.

The proxy authorization unit 408C can perform the following operations: obtaining personal information of a current user, where the personal information of the current user is input by the administrator; sending the personal information of the current user to the server; receiving the identity verification request for the administrator from the server; obtaining the identity information of the administrator based on the identity verification request; and sending the identity information of the administrator to the server, so that the server performs identity verification on the administrator, where the personal information of the current user is used by the server to generate proxy permission information after the identity verification on the administrator succeeds, and the proxy permission information includes at least operation permission information of the current user for the enterprise account.

The units of the apparatus 400C can perform the process described for the second client in the method implementations in FIG. 1A to FIG. 3C. Therefore, for brevity of description, specific operations and functions of the units of the apparatus 400C are omitted here.

The apparatus 400C can be implemented by using hardware, software, or a combination of software and hardware. For example, when the apparatus 400C is implemented by using software, the apparatus 400C can be formed by reading, by using a processor of a device in which the apparatus 400C is located, a corresponding executable instruction from a memory (for example, a nonvolatile memory), and running the corresponding executable instruction in a storage.

Figure 4D:
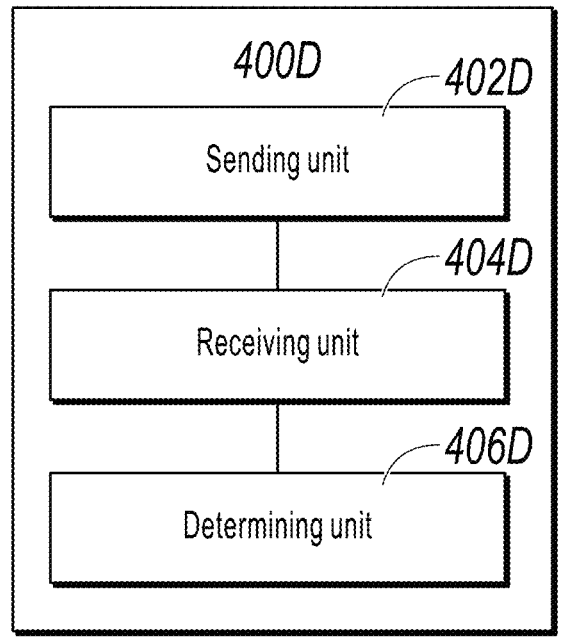
FIG. 4D is a schematic block diagram illustrating a service system, according to an implementation.

FIG. 4D is a schematic block diagram illustrating a service system, according to an implementation. For example, the service system 400D can be the service system 140 in FIG. 1A.

As shown in FIG. 4D, the service system 140 can include a sending unit 402D, a receiving unit 404D, and a determining unit 406D.

The sending unit 402D can send a permission query message to a server when a current user operates an enterprise account registered with the service system. The permission query message is used to query operation permission of the current user for the enterprise account.

The receiving unit 404D can receive proxy permission information from the server. The proxy permission information is obtained by the server from a blockchain after identity verification on the current user succeeds, the proxy permission information includes at least operation permission information of the current user for the enterprise account, and the operation permission information is specified by an administrator of the enterprise account.

The determining unit 406D can determine, based on the proxy permission information, whether to authorize the current user to perform an operation on the enterprise account.

It can be seen that in the technical solutions, the server performs identity verification on the current user who operates the enterprise account to effectively control the risk of the enterprise account. Furthermore, the administrator specifies operation permission of an authorized user to allocate permission for the same account, and therefore the use of the same account can be fine-tuned. In addition, the proxy permission information is stored in the blockchain, and therefore it can be effectively ensured that the permission is trusted, thereby alleviating problems associated with a centralized node and access costs.

In an implementation, the determining unit 406D can further determine authorization management information. The authorization management information can include the operation permission information and an identifier of the service system, and operation permission indicated by the operation permission information is specified by the administrator.

The sending unit 402D can send the authorization management information to the server. The authorization management information is used by the server to determine the proxy permission information, and the proxy permission information is uploaded by the server to the blockchain.

The units of the apparatus 400D can perform the process described for the service system in the method implementations in FIG. 1A to FIG. 3C. Therefore, for brevity of description, specific operations and functions of the units of the apparatus 400D are omitted here.

The apparatus 400D can be implemented by using hardware, software, or a combination of software and hardware. For example, when the apparatus 400D is implemented by using software, the apparatus 400D can be formed by reading, by using a processor of a device in which the apparatus 400D is located, a corresponding executable instruction from a memory (for example, a nonvolatile memory), and running the corresponding executable instruction in a storage.

Figure 5A:
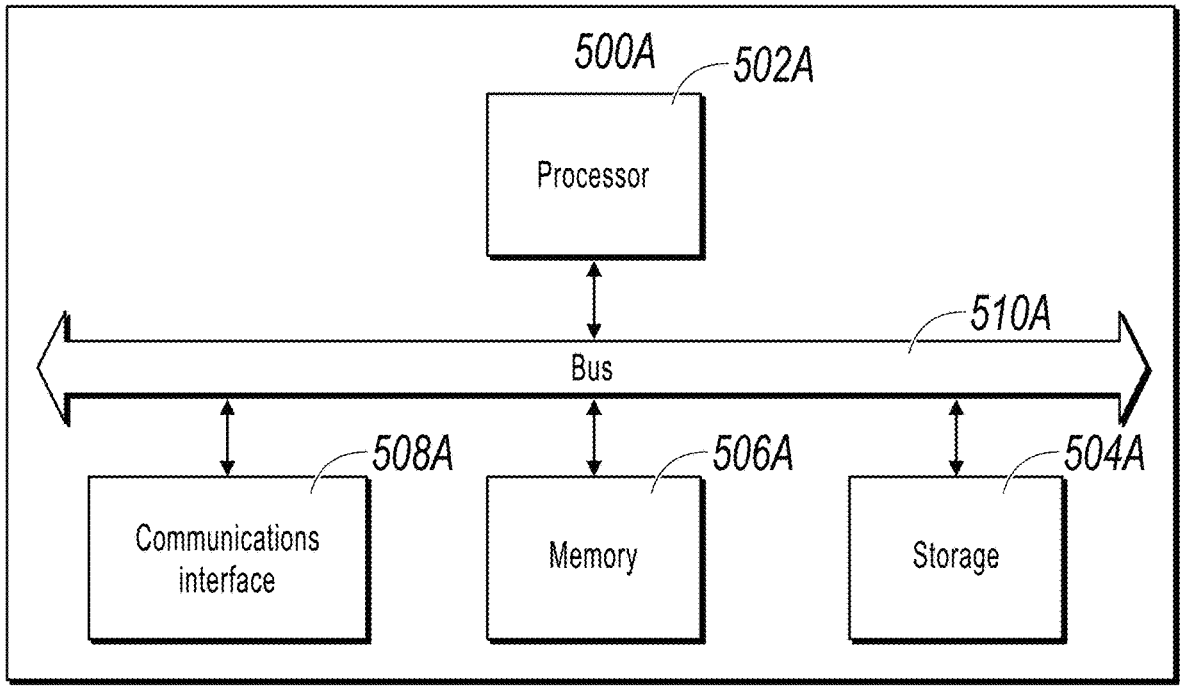
FIG. 5A is a structural diagram of hardware of a computing device for account management, according to an implementation.

FIG. 5A is a structural diagram of hardware of a computing device for account management, according to an implementation. As shown in FIG. 5A, the computing device 500A can include at least one processor 502A, a storage 504A, a memory 506A, and a communications interface 508A. The at least one processor 502A, the storage 504A, the memory 506A, and the communications interface 508A are connected by using a bus 510A. The at least one processor 502A executes at least one executable instruction (namely, the previous element implemented in a software form) stored or encoded in the storage 504A.

In an implementation, when the executable instruction stored in the storage 504A is executed by the at least one processor 502A, the computing device is enabled to implement various processes described for the server in FIG. 1A to FIG. 3C.

The computing device 500A can be implemented in any appropriate form in the art, for example, includes but is not limited to a desktop computer, a laptop computer, a smartphone, a tablet computer, a consumer electronic device, a wearable intelligent device, etc.

Figure 5B:
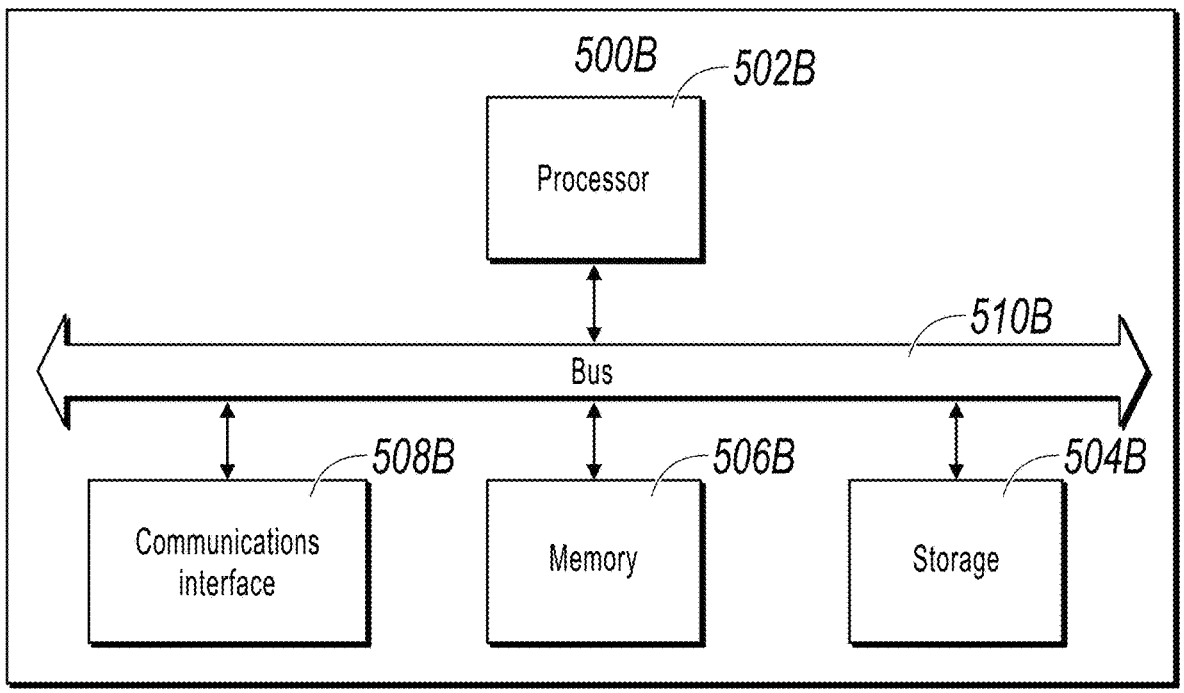
FIG. 5B is a structural diagram of hardware of a computing device for account management, according to an implementation.

FIG. 5B is a structural diagram of hardware of a computing device for account management, according to an implementation. As shown in FIG. 5B, the computing device 500B can include at least one processor 502B, a storage 504B, a memory 506B, and a communications interface 508B. The at least one processor 502B, the storage 504B, the memory 506B, and the communications interface 508B are connected by using a bus 510B. The at least one processor 502B executes at least one executable instruction (namely, the previous element implemented in a software form) stored or encoded in the storage 504B.

In an implementation, when the executable instruction stored in the storage 504B is executed by the at least one processor 502B, the computing device is enabled to implement various processes described for the first client in FIG. 1A to FIG. 3C.

The computing device 500B can be implemented in any appropriate form in the art, for example, includes but is not limited to a desktop computer, a laptop computer, a smartphone, a tablet computer, a consumer electronic device, a wearable intelligent device, etc.

Figure 5C:
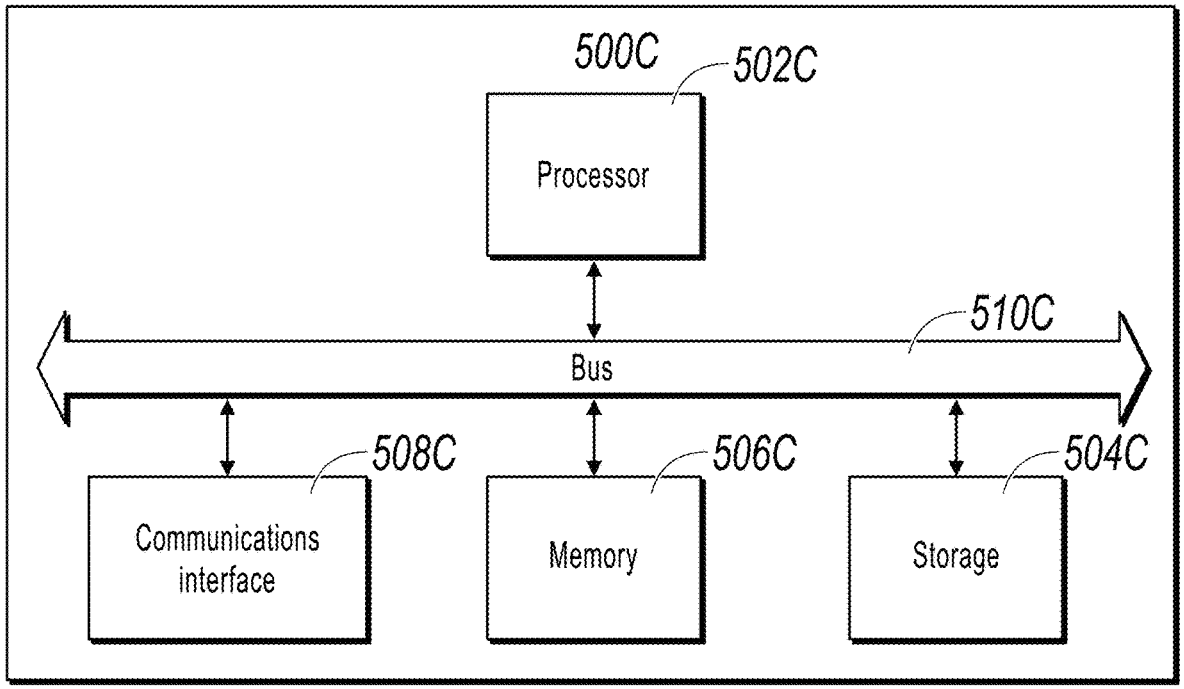
FIG. 5C is a structural diagram of hardware of a computing device for account management, according to an implementation.

FIG. 5C is a structural diagram of hardware of a computing device for account management, according to an implementation. As shown in FIG. 5C, the computing device 500C can include at least one processor 502C, a storage 504C, a memory 506C, and a communications interface 508C. The at least one processor 502C, the storage 504C, the memory 506C, and the communications interface 508C are connected by using a bus 510C. The at least one processor 502C executes at least one executable instruction (namely, the previous element implemented in a software form) stored or encoded in the storage 504C.

In an implementation, when the executable instruction stored in the storage 504C is executed by the at least one processor 502C, the computing device is enabled to implement various processes described for the second client in FIG. 1A to FIG. 3C.

The computing device 500C can be implemented in any appropriate form in the art, for example, includes but is not limited to a desktop computer, a laptop computer, a smartphone, a tablet computer, a consumer electronic device, a wearable intelligent device, etc.

Figure 5D:
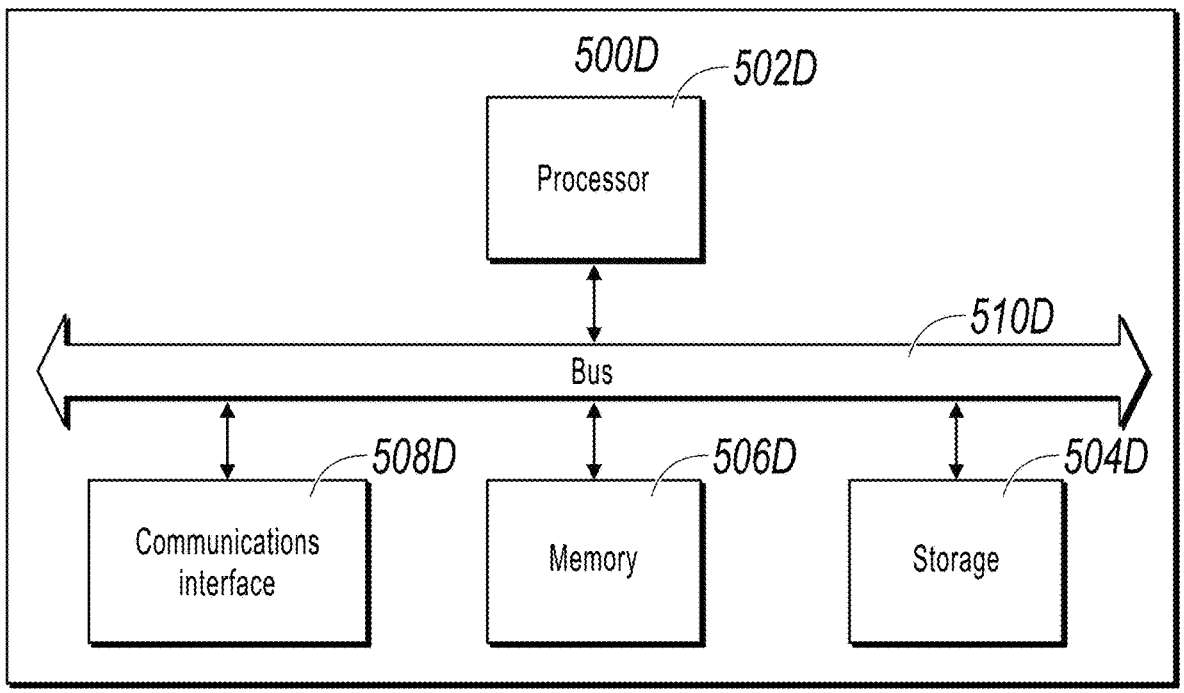
FIG. 5D is a structural diagram of hardware of a computing device for account management, according to an implementation.

FIG. 5D is a structural diagram of hardware of a computing device for account management, according to an implementation. As shown in FIG. 5D, the computing device 500D can include at least one processor 502D, a storage 504D, a memory 506D, and a communications interface 508D. The at least one processor 502D, the storage 504D, the memory 506D, and the communications interface 508D are connected by using a bus 510D. The at least one processor 502D executes at least one executable instruction (namely, the previous element implemented in a software form) stored or encoded in the storage 504D.

In an implementation, when the executable instruction stored in the storage 504D is executed by the at least one processor 502D, the computing device is enabled to implement various processes described for the service system in FIG. 1A to FIG. 3C.

The computing device 500D can be implemented in any appropriate form in the art, for example, includes but is not limited to a desktop computer, a laptop computer, a smartphone, a tablet computer, a consumer electronic device, a wearable intelligent device, etc.

An implementation of the present specification further provides a machine-readable storage medium. The machine-readable storage medium can store an executable instruction. When the executable instruction is executed by a machine, the machine is enabled to implement the specific process described for the server in FIG. 1A to FIG. 3C.

An implementation of the present specification further provides a machine-readable storage medium. The machine-readable storage medium can store an executable instruction. When the executable instruction is executed by a machine, the machine is enabled to implement the specific process described for the first client in FIG. 1A to FIG. 3C.

An implementation of the present specification further provides a machine-readable storage medium. The machine-readable storage medium can store an executable instruction. When the executable instruction is executed by a machine, the machine is enabled to implement the specific process described for the second client in FIG. 1A to FIG. 3C.

An implementation of the present specification further provides a machine-readable storage medium. The machine-readable storage medium can store an executable instruction. When the executable instruction is executed by a machine, the machine is enabled to implement the specific process described for the service system in FIG. 1A to FIG. 3C.

The machine-readable storage medium can be implemented in any appropriate form known in the art. For example, the machine-readable storage medium can include but is not limited to a random access memory (RAM), a read-only memory (ROM), an electrically erasable programmable read-only memory (EEPROM), a static random access memory (SRAM), a hard disk, a flash memory, etc.

It should be understood that the implementations of the present specification are described in a progressive way. For the same or similar parts in the implementations, references can be made to the implementations. Each implementation focuses on a difference from other implementations. For example, the implementation of the apparatus, the implementation of the computing device, and the implementation of the machine-readable storage medium are basically similar to the method implementation, and therefore are briefly described. For related parts, references can be made to partial description in the method implementation.

Specific implementations of the present specification are described above. Other implementations fall within the scope of the appended claims. In some cases, the actions or steps described in the claims can be performed in an order different from the order in the implementations and the desired results can still be achieved. In addition, the process described in the accompanying drawings does not necessarily require a particular execution order to achieve the desired results. In some implementations, multi-tasking and parallel processing can be advantageous.

Not all the steps and units in the previous flowcharts and the structural diagrams of the system are needed. Some steps or units can be ignored based on actual demands. The apparatus structure described in the previous implementations can be a physical structure, or can be a logical structure. That is, some units can be implemented by the same physical entity, or some units can be respectively implemented by a plurality of physical entities, or can be implemented jointly by some components in a plurality of independent devices.

The term "example" in the entire specification means "used as an example or an instance", and does not mean "preferred" or "advantageous" over other implementations. To provide an understanding of the described technologies, specific implementations include specific details. However, these technologies can be implemented without these specific details. In some instances, known structures and apparatuses are shown in block diagrams to avoid making it difficult to understand the concepts of the described implementations.

Optional implementations of the implementations of the present disclosure are described above in detail with reference to the accompanying drawings. However, the implementations of the present disclosure are not limited to the specific details in the previous implementations. Within the technical concept scope of the implementations of the present disclosure, a plurality of variations can be made to the technical solutions of the implementations of the present disclosure, and these variations all fall within the protection scope of the implementations of the present disclosure.

The previous description of the present disclosure is provided to enable any user of ordinary skill in the art to implement or use the present disclosure. It is obvious to a user of ordinary skill in the art that various modifications are made to the present disclosure. In addition, the general principle defined in the present specification can be applied to other variations without departing from the protection scope of the present disclosure. Therefore, the present disclosure is not limited to the examples and designs described in the present specification, but is consistent with the widest scope of principles and novelty features that satisfy the present disclosure.

What is claimed is:

1. A computer-implemented method for account management, the method comprising:
   verifying an identity of an administrator of an enterprise account registered with a service system;
   in response to verifying the identity of the administrator, determining a digital certificate for proving authenticity of the administrator and an enterprise associated with the enterprise account;
   sending the digital certificate to a second client installed on a second end-user device of the administrator;
   after sending the digital certificate to the second client:
      obtaining personal information of a current user from the second client based on authorization management information, wherein the personal information of the current user is input by the administrator;
      obtaining identity information of the administrator from the second client;
      performing identity verification on the administrator based on the identity information of the administrator to verify the identity of the administrator;
      in response to verifying the identity of the administrator, obtaining signature information for digest information from the second client, wherein the digest information is generated based on at least operation permission information of the current user for the enterprise account and the personal information of the current user, and the signature information is generated by the second client based on the digital certificate;
      generating proxy permission information comprising at least the operation permission information, the personal information of the current user, the digest information, and the signature information; and
      uploading the proxy permission information to a blockchain;
   receiving a permission query message from the service system, wherein the service system sends the permission query message to query operation permission of the current user for the enterprise account in response to the current user performing a service operation based on the enterprise account;
   obtaining verification information from a first client based on the permission query message, wherein the first client is installed on a first end-user device of the current user, and the verification information is associated with an identity of the current user;
   determining that the verification information is valid;
   in response to determining that the verification information is valid, obtaining, from the blockchain, proxy permission information for the current user, wherein the proxy permission information for the current user, and wherein operation permission indicated by the operation permission information is specified by the administrator of the enterprise account; and
   sending the proxy permission information to the service system, the proxy permission information configured to be usable by the service system to determine whether to authorize the current user to perform an operation on the enterprise account.

2. The computer-implemented method of claim 1, wherein:
   the verification information comprises an authorization code; and
   obtaining the verification information from the first client comprises:
      sending an authorization instruction to the first client, wherein the authorization instruction requests the authorization code; and
      receiving the authorization code from the first client, wherein the authorization code is generated by the first client based on the authorization instruction and a client token.

3. The computer-implemented method of claim 2, wherein, before the receiving the authorization code from the first client, the method further comprises:

receiving, from the first client, a token request message for requesting the client token;
obtaining identity information of the current user from the first client based on the token request message;
determining, based on the identity information of the current user, that the current user is one of a plurality of authorized users for the enterprise account, wherein information about the authorized users is obtained from the blockchain;
generating the client token; and
sending the client token to the first client.

4. The computer-implemented method of claim 3, wherein generating the client token comprises generating the client token using a digital signature function based on a private key, the identity information of the current user, and a random number.

5. The computer-implemented method of claim 1, wherein before receiving the permission query message from the service system, the method further comprises:
obtaining initialization information when an initialization request for the administrator is received from the second client, wherein the initialization information comprises personal information of the administrator, device information of the second end-user device of the administrator, and information about the enterprise associated with the enterprise account;
determining that the initialization information is valid; and
obtaining identity information of the administrator from the second client in response to determining that the initialization information is valid,
wherein verifying the identity of the administrator of the enterprise account registered with the service system comprises performing identity verification on the administrator based on the identity information of the administrator.

6. A non-transitory, computer-readable medium storing one or more instructions executable by a computer system to perform operations comprising:
verifying an identity of an administrator of an enterprise account registered with a service system;
in response to verifying the identity of the administrator, determining a digital certificate for proving authenticity of the administrator and an enterprise associated with the enterprise account;
sending the digital certificate to a second client installed on a second end-user device of the administrator;
after sending the digital certificate to the second client:
obtaining personal information of a current user from the second client based on authorization management information, wherein the personal information of the current user is input by the administrator;
obtaining identity information of the administrator from the second client;
performing identity verification on the administrator based on the identity information of the administrator to verify the identity of the administrator;
in response to verifying the identity of the administrator, obtaining signature information for digest information from the second client, wherein the digest information is generated based on at least operation permission information of the current user for the enterprise account and the personal information of the current user, and the signature information is generated by the second client based on the digital certificate;
generating proxy permission information comprising at least the operation permission information, the personal information of the current user, the digest information, and the signature information; and
uploading the proxy permission information to a blockchain;
receiving a permission query message from the service system, wherein the service system sends the permission query message to query operation permission of the current user for the enterprise account in response to the current user performing a service operation based on the enterprise account;
obtaining verification information from a first client based on the permission query message, wherein the first client is installed on a first end-user device of the current user, and the verification information is associated with an identity of the current user;
determining that the verification information is valid;
in response to determining that the verification information is valid, obtaining, from the blockchain, proxy permission information for the current user, wherein the proxy permission information for the current user, and wherein operation permission indicated by the operation permission information is specified by the administrator of the enterprise account; and
sending the proxy permission information to the service system, the proxy permission information configured to be usable by the service system to determine whether to authorize the current user to perform an operation on the enterprise account.

7. The non-transitory, computer-readable medium of claim 6, wherein:
the verification information comprises an authorization code; and
obtaining the verification information from the first client comprises:
sending an authorization instruction to the first client, wherein the authorization instruction requests the authorization code; and
receiving the authorization code from the first client, wherein the authorization code is generated by the first client based on the authorization instruction and a client token.

8. The non-transitory, computer-readable medium of claim 7, wherein, before the receiving the authorization code from the first client, the operations further comprise:
receiving, from the first client, a token request message for requesting the client token;
obtaining identity information of the current user from the first client based on the token request message;
determining, based on the identity information of the current user, that the current user is one of a plurality of authorized users for the enterprise account, wherein information about the authorized users is obtained from the blockchain;
generating the client token; and
sending the client token to the first client.

9. The non-transitory, computer-readable medium of claim 8, wherein generating the client token comprises generating the client token using a digital signature function based on a private key, the identity information of the current user, and a random number.

10. The non-transitory, computer-readable medium of claim 6, wherein before receiving the permission query message from the service system, the operations further comprise:

obtaining initialization information when an initialization request for the administrator is received from the second client, wherein the initialization information comprises personal information of the administrator, device information of the second end-user device of the administrator, and information about the enterprise associated with the enterprise account;
determining that the initialization information is valid; and
obtaining identity information of the administrator from the second client in response to determining that the initialization information is valid,
wherein verifying the identity of the administrator of the enterprise account registered with the service system comprises performing identity verification on the administrator based on the identity information of the administrator.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  verifying an identity of an administrator of an enterprise account registered with a service system;
  in response to verifying the identity of the administrator, determining a digital certificate for proving authenticity of the administrator and an enterprise associated with the enterprise account;
  sending the digital certificate to a second client installed on a second end-user device of the administrator;
  after sending the digital certificate to the second client:
    obtaining personal information of a current user from the second client based on authorization management information, wherein the personal information of the current user is input by the administrator;
    obtaining identity information of the administrator from the second client;
    performing identity verification on the administrator based on the identity information of the administrator to verify the identity of the administrator;
    in response to verifying the identity of the administrator, obtaining signature information for digest information from the second client, wherein the digest information is generated based on at least operation permission information of the current user for the enterprise account and the personal information of the current user, and the signature information is generated by the second client based on the digital certificate;
    generating proxy permission information comprising at least the operation permission information, the personal information of the current user, the digest information, and the signature information; and
    uploading the proxy permission information to a blockchain;
  receiving a permission query message from the service system, wherein the service system sends the permission query message to query operation permission of the current user for the enterprise account in response to the current user performing a service operation based on the enterprise account;
  obtaining verification information from a first client based on the permission query message, wherein the first client is installed on a first end-user device of the current user, and the verification information is associated with an identity of the current user;
  determining that the verification information is valid;
  in response to determining that the verification information is valid, obtaining, from the blockchain, proxy permission information for the current user, wherein the proxy permission information for the current user, and wherein operation permission indicated by the operation permission information is specified by the administrator of the enterprise account; and
  sending the proxy permission information to the service system, the proxy permission information configured to be usable by the service system to determine whether to authorize the current user to perform an operation on the enterprise account.

12. The computer-implemented system of claim 11, wherein:
the verification information comprises an authorization code; and
obtaining the verification information from the first client comprises:
  sending an authorization instruction to the first client, wherein the authorization instruction requests the authorization code; and
  receiving the authorization code from the first client, wherein the authorization code is generated by the first client based on the authorization instruction and a client token.

13. The computer-implemented system of claim 12, wherein, before the receiving the authorization code from the first client, the operations further comprise:
receiving, from the first client, a token request message for requesting the client token;
obtaining identity information of the current user from the first client based on the token request message;
determining, based on the identity information of the current user, that the current user is one of a plurality of authorized users for the enterprise account, wherein information about the authorized users is obtained from the blockchain;
generating the client token; and
sending the client token to the first client.

14. The computer-implemented system of claim 13, wherein generating the client token comprises generating the client token using a digital signature function based on a private key, the identity information of the current user, and a random number.

15. The computer-implemented system of claim 11, wherein before receiving the permission query message from the service system, the operations further comprise:
obtaining initialization information when an initialization request for the administrator is received from the second client, wherein the initialization information comprises personal information of the administrator, device information of the second end-user device of the administrator, and information about the enterprise associated with the enterprise account;
determining that the initialization information is valid; and
obtaining identity information of the administrator from the second client in response to determining that the initialization information is valid, wherein verifying the identity of the administrator of the enterprise account registered with the service system comprises performing identity verification on the administrator based on the identity information of the administrator.

* * * * *